US011080212B2

(12) United States Patent
Iyer et al.

(10) Patent No.: US 11,080,212 B2
(45) Date of Patent: Aug. 3, 2021

(54) HIGH PERFORMANCE INTERCONNECT PHYSICAL LAYER

(71) Applicant: Intel Corporation, Santa Clara, CA (US)

(72) Inventors: Venkatraman Iyer, Austin, TX (US); Darren S. Jue, Sunnyvale, CA (US); Jeff Willey, Timnath, CO (US); Robert G. Blankenship, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/835,241

(22) Filed: Mar. 30, 2020

(65) Prior Publication Data

US 2020/0356496 A1 Nov. 12, 2020

Related U.S. Application Data

(63) Continuation of application No. 15/851,705, filed on Dec. 21, 2017, now Pat. No. 10,606,774, which is a (Continued)

(51) Int. Cl.
*G06F 13/42* (2006.01)
*G06F 13/16* (2006.01)
(Continued)

(52) U.S. Cl.
CPC ............ *G06F 13/161* (2013.01); *G06F 1/12* (2013.01); *G06F 13/1673* (2013.01);
(Continued)

(58) Field of Classification Search
CPC ............... G06F 13/161; G06F 13/1673; G06F 13/4004; G06F 13/4068; G06F 13/4221; G06F 1/12; H04L 45/74; H04L 49/15
See application file for complete search history.

(56) References Cited

U.S. PATENT DOCUMENTS 6,223,268 B1 4/2001 Paluch et al.
6,449,667 B1 9/2002 Ganmukhi et al.
(Continued)

FOREIGN PATENT DOCUMENTS

CN 1255001 A 5/2000
CN 102315917 A 1/2012
(Continued)

OTHER PUBLICATIONS

China Patent Office. Second Office Aciton issued in Chinese Patent Application No. CN 201710243776.X, dated Aug. 28, 2020; 13 pages including English translation.
(Continued)

Primary Examiner — Nitin C Patel
(74) Attorney, Agent, or Firm — Alliance IP, LLC

(57) ABSTRACT

A supersequence corresponding to an initialization state is received on a link that includes a repeating pattern of an electrical idle exit ordered set (EIEOS) followed by a number of consecutive training sequences. Instances of the EIEOS are to be aligned with a rollover of a sync counter. A latency value is determined from one of the EIEOS instances in the supersequence and latency is added to a receive path of the link through a latency buffer based on the latency value.

26 Claims, 16 Drawing Sheets

Related U.S. Application Data continuation of application No. 15/393,427, filed on Dec. 29, 2016, now Pat. No. 10,387,339, which is a continuation of application No. 14/538,919, filed on Nov. 12, 2014, now Pat. No. 9,697,158, which is a continuation of application No. 13/976,927, filed as application No. PCT/US2013/034153 on Mar. 27, 2013, now Pat. No. 9,280,507.

(60) Provisional application No. 61/717,091, filed on Oct. 22, 2012.

(51) Int. Cl.
*G06F 1/12* (2006.01)
*G06F 13/40* (2006.01)
*H04L 12/933* (2013.01)
*H04L 12/741* (2013.01)

(52) U.S. Cl.
CPC ...... *G06F 13/4004* (2013.01); *G06F 13/4068* (2013.01); *G06F 13/4221* (2013.01); *H04L 45/74* (2013.01); *H04L 49/15* (2013.01)

(56) References Cited

U.S. PATENT DOCUMENTS

| | | | |
|---|---|---|---|
| 6,574,225 | B2 | 6/2003 | Reynolds et al. |
| 6,628,615 | B1 | 9/2003 | Joseph et al. |
| 6,674,720 | B1 | 1/2004 | Passint et al. |
| 6,751,698 | B1 | 6/2004 | Deneroff et al. |
| 6,940,918 | B1 | 9/2005 | Nayler et al. |
| 6,961,347 | B1 | 11/2005 | Bunton et al. |
| 7,010,607 | B1 | 3/2006 | Bunton |
| 7,447,794 | B1 | 11/2008 | Miller et al. |
| 7,586,951 | B2 | 9/2009 | Frodsham et al. |
| 7,957,428 | B2 | 6/2011 | Steinman et al. |
| 8,488,729 | B1 | 7/2013 | Mendel et al. |
| 2004/0095967 | A1 | 5/2004 | Sharma |
| 2005/0080869 | A1 | 4/2005 | Bender et al. |
| 2005/0262336 | A1 | 11/2005 | Cherukuri et al. |
| 2007/0133415 | A1 | 6/2007 | Spink |
| 2007/0264730 | A1 | 11/2007 | Frodsham et al. |
| 2008/0069118 | A1 | 3/2008 | Monier |
| 2009/0024833 | A1 | 1/2009 | Deneroff et al. |
| 2010/0109726 | A1 | 5/2010 | Ahn et al. |
| 2010/0150053 | A1 | 6/2010 | Becker et al. |
| 2010/0205442 | A1 | 8/2010 | Han et al. |
| 2012/0011276 | A1 | 1/2012 | Cherukuri et al. |
| 2012/0079156 | A1 | 3/2012 | Safranek et al. |
| 2012/0191887 | A1 | 7/2012 | Yamauchi et al. |
| 2013/0051237 | A1 | 2/2013 | Ong |
| 2013/0272706 | A1 | 10/2013 | Luo et al. |
| 2014/0115374 | A1 | 4/2014 | Iyer et al. |
| 2015/0169486 | A1 | 6/2015 | Iyer et al. |

FOREIGN PATENT DOCUMENTS

| | | |
|---|---|---|
| CN | 102541791 A | 7/2012 |
| CN | 102571571 A | 7/2012 |

OTHER PUBLICATIONS

Debendra D.S., "PCie® PHY Logical," PCU-SIG Developers Conference, Intel Corporation, 2010, 32 pages.

China Patent Office First Office Action issued in Chinese Patent Application No. CN 201710243776.X, dated Feb. 6, 2020; 17 pages with English translation.

SIPO; First Office Action issued in CN Patent Application No. 201810095156.0, dated Jun. 3, 2021; 13 pages including English translation.

Zhou, Hong-wei, et al.; "Design and Performance Analysis of an Interconnect Interface for Multi-Core Microprocessor;" published in the Journal of National University of Defense Technology, vol. 32, No. 4; 2010; 6 pages (English abstract only).

DETECT ⤶ 805

| EIEOS | TS 0 | TS 1 | TS 2 | TS 3 | . . . . . | TS 6 | ~1KUI |

POLLING/CONFIG/LOOPBACK ⤶ 810

| EIEOS | TS 0 | TS 1 | TS 2 | TS 3 | . . . . . | TS 30 | ~4KUI |

PARTIAL WIDTH TRANSMITTING STATE EXIT ⤶ 815

| EIEOS | | | | | | | |
| EIEOS | FTS 0 | FTS 1 | FTS 2 | FTS 3 | . . . . . | FTS 6 | ~1KUI |
| EIEOS | FTS | FTS | . . . . . | SDS | FTSp | | |

| UI | 0 | 1 | 2 | 3 | 4 | 5 | 6 | 7 |
|---|---|---|---|---|---|---|---|---|
| 0,1,2,3 | 5 | 11 | 17 | 23 | 29 | 35 | 41 | 47 |
| 4,5,6,7 | 4 | 10 | 16 | 22 | 28 | 34 | 40 | 46 |
| 8,9,10,11 | 3 | 9 | 15 | 21 | 27 | 33 | 39 | 45 |
| 12,13,14,15 | 2 | 8 | 14 | 20 | 26 | 32 | 38 | 44 |
| 16,17,18,19 | 1 | 7 | 13 | 19 | 25 | 31 | 37 | 43 |
| 20,21,22,23 | 0 | 6 | 12 | 18 | 24 | 30 | 36 | 42 |

FIG. 11

HIGH PERFORMANCE INTERCONNECT PHYSICAL LAYER

CROSS-REFERENCE TO RELATED APPLICATIONS

This application is a continuation of U.S. application Ser. No. 15/851,705, filed Dec. 21, 2017, which is a continuation of U.S. application Ser. No. 15/393,427, filed Dec. 29, 2016, now issued as U.S. Pat. No. 10,387,339, on Aug. 20, 2019, which is a continuation of U.S. application Ser. No. 14/538,919, filed Nov. 12, 2014, now issued as U.S. Pat. No. 9,697,158 on Jul. 4, 2017, which is a continuation of U.S. application Ser. No. 13/976,927, filed Jun. 27, 2013, now U.S. Pat. No. 9,280,507 issued Mar. 8, 2016, which application is a national stage under 35 U.S.C. 371 of PCT International Application Serial No. PCT/US2013/034153, filed on Mar. 27, 2013 and entitled HIGH PERFORMANCE INTERCONNECT PHYSICAL LAYER, which application claims the benefit of priority to U.S. Provisional Patent Application Ser. No. 61/717,091 filed on Oct. 22, 2012 and entitled METHOD, APPARATUS, SYSTEM FOR A HIGH PERFORMANCE INTERCONNECT ARCHITECTURE. The disclosures of the prior applications are considered part of and are hereby incorporated by reference in their entirety in the disclosure of this application.

FIELD

The present disclosure relates in general to the field of computer development, and more specifically, to software development involving coordination of mutually-dependent constrained systems.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 8 illustrates example control supersequences.

FIG. 10 illustrates a representation of an example flit sent over an example twenty-lane data link.

FIG. 11 illustrates a representation of an example flit sent over an example eight-lane data link.

Like reference numbers and designations in the various drawings indicate like elements.

DETAILED DESCRIPTION

Figure 1:
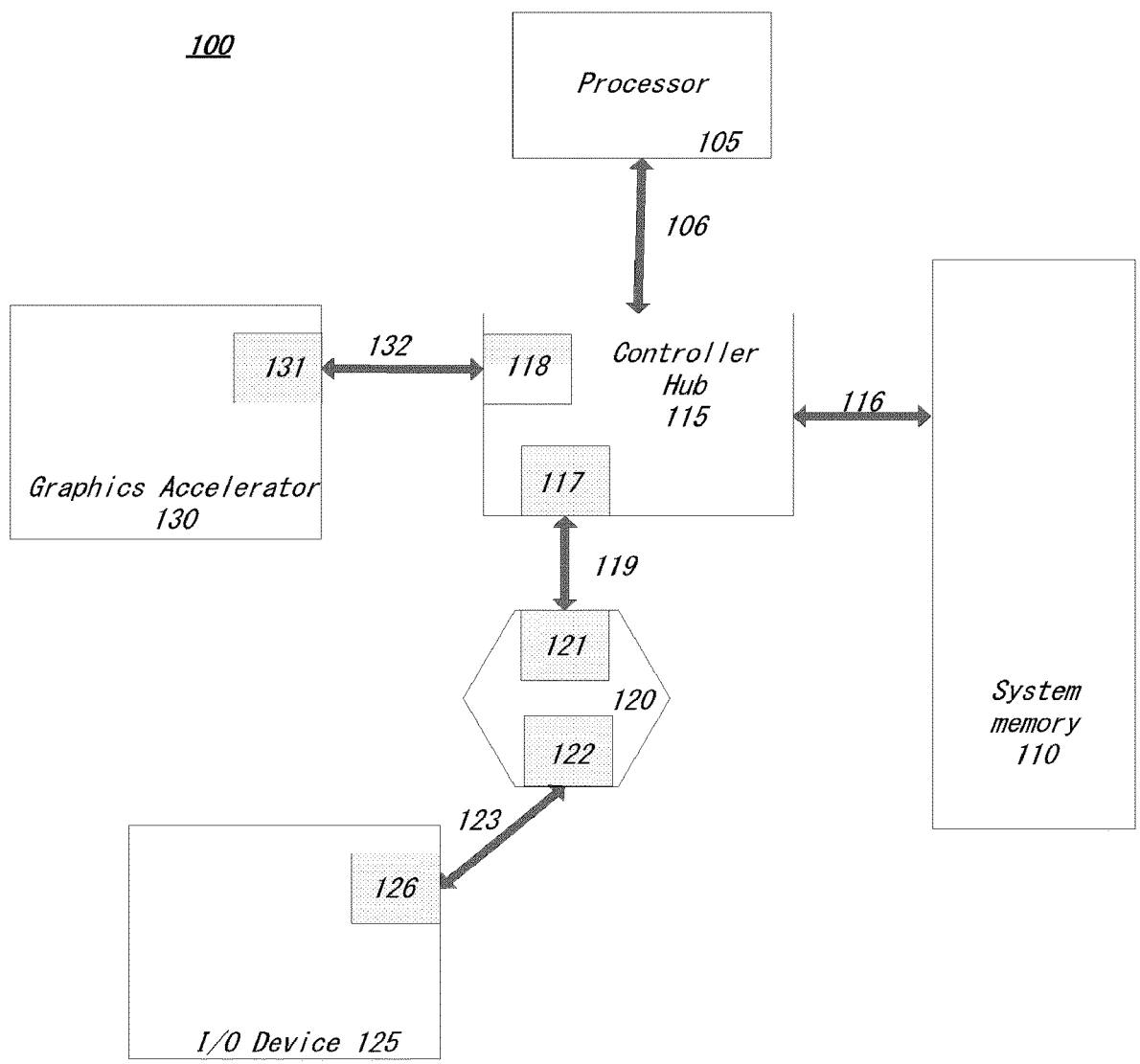
FIG. 1 illustrates a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein.

The Peripheral Component Interconnect (PCI) Express (PCIe) interconnect fabric architecture and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. Although the primary discussion herein is in reference to a new high-performance interconnect (HPI) architecture, aspects of the invention described herein may be applied to other interconnect architectures, such as a PCIe-compliant architecture, a QPI-compliant architecture, a MIPI compliant architecture, a high-performance architecture, or other known interconnect architecture.

Referring to FIG. 1, an embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
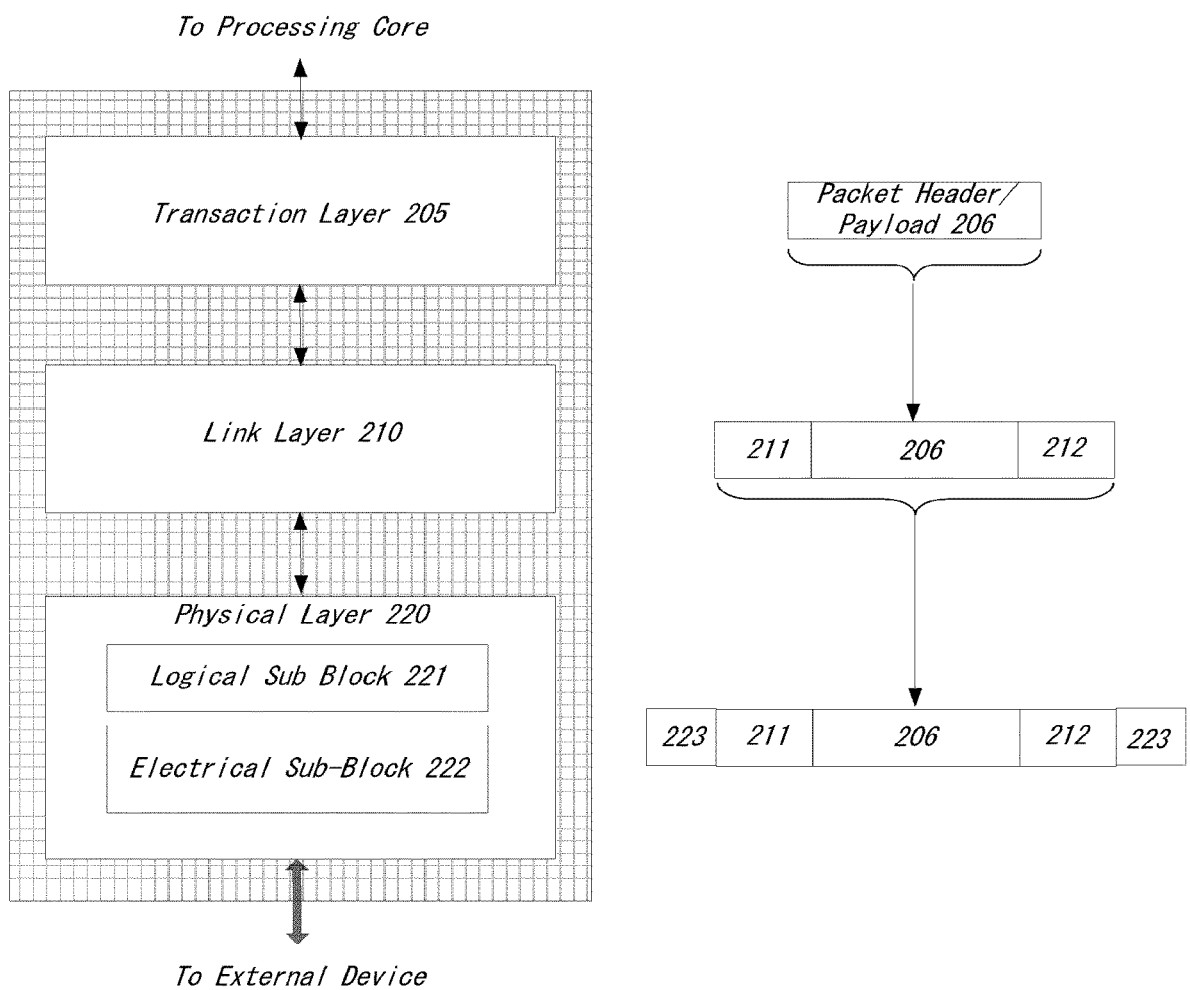
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Figure 3:
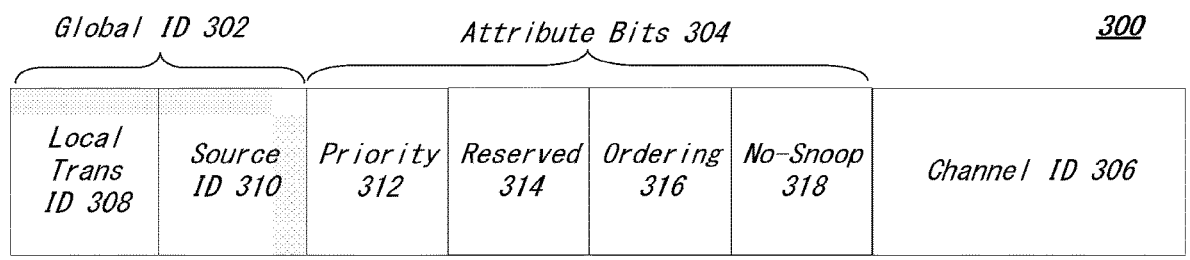
FIG. 3 illustrates an embodiment of a transaction descriptor.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8$b$/10$b$ transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 4:
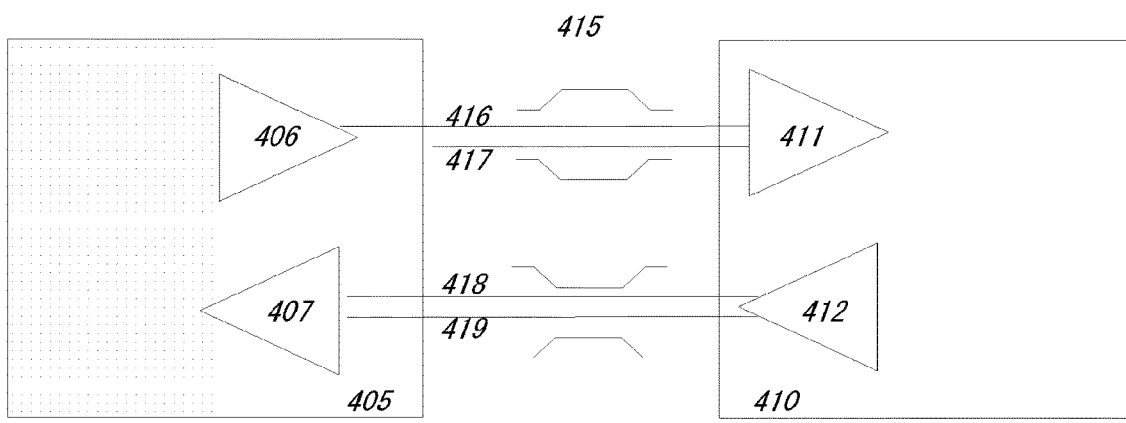
FIG. 4 illustrates an embodiment of a serial point-to-point link.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

In one embodiment, a new High Performance Interconnect (HPI) is provided. HPI can include a next-generation cache-coherent, link-based interconnect. As one example, HPI may be utilized in high performance computing platforms, such as workstations or servers, including in systems where PCIe or another interconnect protocol is typically used to connect processors, accelerators, I/O devices, and the like. However, HPI is not so limited. Instead, HPI may be utilized in any of the systems or platforms described herein. Furthermore, the individual ideas developed may be applied to other interconnects and platforms, such as PCIe, MIPI, QPI, etc.

Figure 5:
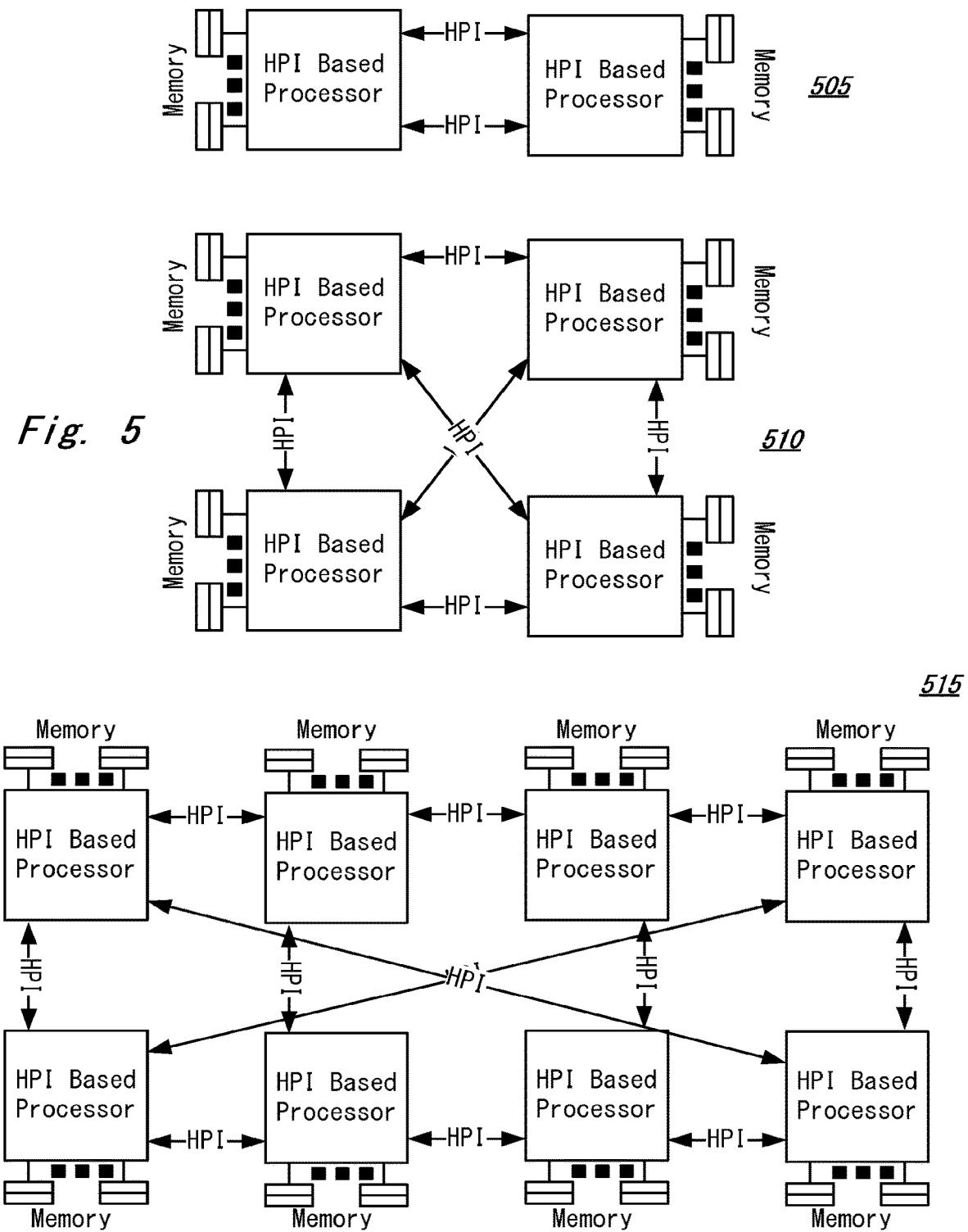
FIG. 5 illustrates embodiments of potential High Performance Interconnect (HPI) system configurations.

To support multiple devices, in one example implementation, HPI can include an Instruction Set Architecture (ISA) agnostic (i.e. HPI is able to be implemented in multiple different devices). In another scenario, HPI may also be utilized to connect high performance I/O devices, not just processors or accelerators. For example, a high performance PCIe device may be coupled to HPI through an appropriate translation bridge (i.e. HPI to PCIe). Moreover, the HPI links may be utilized by many HPI based devices, such as processors, in various ways (e.g. stars, rings, meshes, etc.). FIG. 5 illustrates example implementations of multiple potential multi-socket configurations. A two-socket configuration 505, as depicted, can include two HPI links; however, in other implementations, one HPI link may be utilized. For larger topologies, any configuration may be utilized as long as an identifier (ID) is assignable and there is some form of virtual path, among other additional or substitute features. As shown, in one example, a four socket configuration 510 has an HPI link from each processor to another. But in the eight socket implementation shown in configuration 515, not every socket is directly connected to each other through an HPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The HPI architecture includes a definition of a layered protocol architecture, including in some examples, protocol layers (coherent, non-coherent, and, optionally, other memory based protocols), a routing layer, a link layer, and a physical layer. Furthermore, HPI can further include enhancements related to power managers (such as power control units (PCUs)), design for test and debug (DFT), fault handling, registers, security, among other examples. FIG. 5 illustrates an embodiment of an example HPI layered protocol stack. In some implementations, at least some of the layers illustrated in FIG. 5 may be optional. Each layer deals with its own level of granularity or quantum of information (the protocol layer 605$a,b$ with packets 630, link layer 610$a,b$ with flits 635, and physical layer 605$a,b$ with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610*a,b* is capable of embedding multiple pieces of different transactions in a single flit, and one or multiple headers (e.g. 1, 2, 3, 4) may be embedded within the flit. In one example, HPI splits the headers into corresponding slots to enable multiple messages in the flit destined for different nodes.

Physical layer 605*a,b*, in one embodiment, can be responsible for the fast transfer of information on the physical medium (electrical or optical etc.). The physical link can be point-to-point between two Link layer entities, such as layer 605*a* and 605*b*. The Link layer 610*a,b* can abstract the Physical layer 605*a,b* from the upper layers and provides the capability to reliably transfer data (as well as requests) and manage flow control between two directly connected entities. The Link Layer can also be responsible for virtualizing the physical channel into multiple virtual channels and message classes. The Protocol layer 620*a,b* relies on the Link layer 610*a,b* to map protocol messages into the appropriate message classes and virtual channels before handing them to the Physical layer 605*a,b* for transfer across the physical links. Link layer 610*a,b* may support multiple messages, such as a request, snoop, response, writeback, non-coherent data, among other examples.

Figure 6:
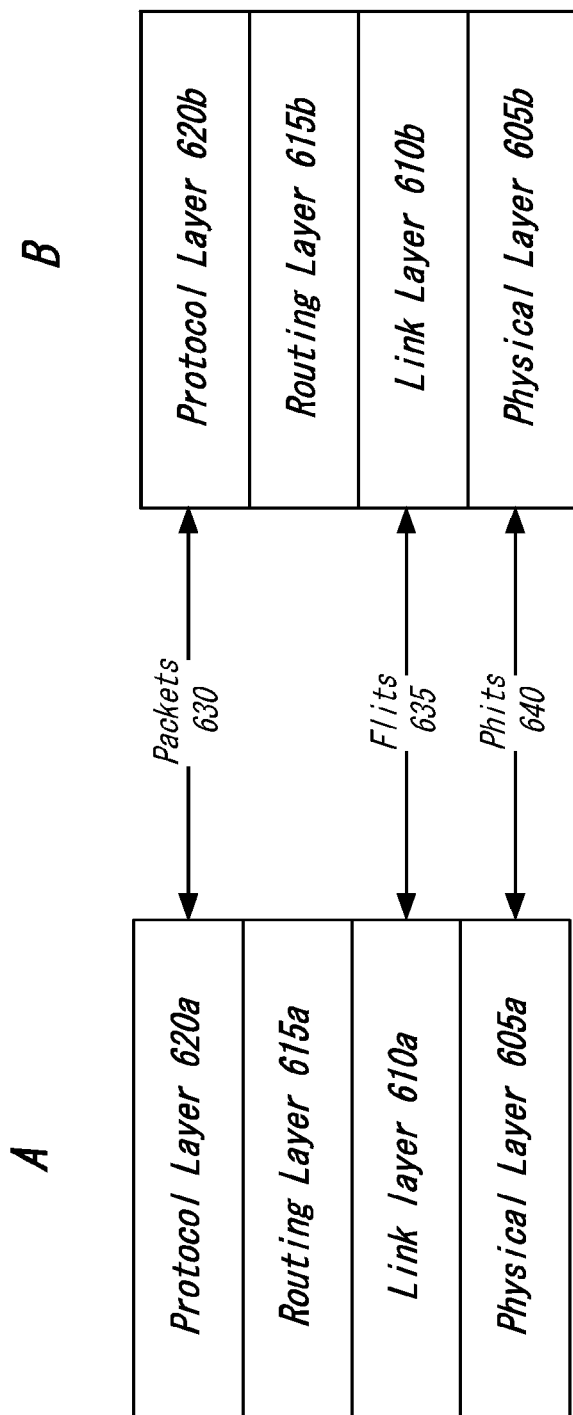
FIG. 6 illustrates an embodiment of a layered protocol stack associated with HPI.

The Physical layer 605*a,b* (or PHY) of HPI can be implemented above the electrical layer (i.e. electrical conductors connecting two components) and below the link layer 610*a,b*, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605*a,b*, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610*a,b* can be implemented so as to provide reliable data transfer between two protocol or routing entities. The Link layer can abstract Physical layer 605*a,b* from the Protocol layer 620*a,b*, and can be responsible for the flow control between two protocol agents (A, B), and provide virtual channel services to the Protocol layer (Message Classes) and Routing layer (Virtual Networks). The interface between the Protocol layer 620*a,b* and the Link Layer 610*a,b* can typically be at the packet level. In one embodiment, the smallest transfer unit at the Link Layer is referred to as a flit which a specified number of bits, such as 192 bits or some other denomination. The Link Layer 610*a,b* relies on the Physical layer 605*a,b* to frame the Physical layer's 605*a,b* unit of transfer (phit) into the Link Layer's 610*a,b* unit of transfer (flit). In addition, the Link Layer 610*a,b* may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615*a,b* can provide a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615*a,b* relies on the Link layer 610*a,b* for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In some implementations, HPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

A link can be established between two agents on either side of an interconnect. An agent sending data can be a local agent and the agent receiving the data can be a remote agent. State machines can be employed by both agents to manage various aspects of the link. In one embodiment, the Physical layer datapath can transmit flits from the link layer to the electrical front-end. The control path, in one implementation, includes a state machine (also referred to as a link training state machine or the similar). The state machine's actions and exits from states may depend on internal signals, timers, external signals or other information. In fact, some of the states, such as a few initialization states, may have timers to provide a timeout value to exit a state. Note that detect, in some embodiments, refers to detecting an event on both legs of a lane; but not necessarily simultaneously. However, in other embodiments, detect refers to detection of an event by an agent of reference. Debounce, as one example, refers to sustained assertion of a signal. In one embodiment, HPI supports operation in the event of non-function lanes. Here, lanes may be dropped at specific states.

States defined in the state machine can include reset states, initialization states, and operational states, among other categories and subcategories. In one example, some initialization states can have a secondary timer which is used to exit the state on a timeout (essentially an abort due to failure to make progress in the state). An abort may include updating of registers, such as status register. Some states can also have primary timer(s) which are used to time the primary functions in the state. Other states can be defined such that internal or external signals (such as handshake protocols) drive transition from the state to another state, among other examples.

A state machine may also support debug through single step, freeze on initialization abort and use of testers. Here, state exits can be postponed/held until the debug software is ready. In some instance, the exit can be postponed/held until the secondary timeout. Actions and exits, in one embodiment, can be based on exchange of training sequences. In one embodiment, the link state machine is to run in the local agent clock domain and transition from one state to the next is to coincide with a transmitter training sequence boundary. Status registers may be utilized to reflect the current state.

Figure 7:
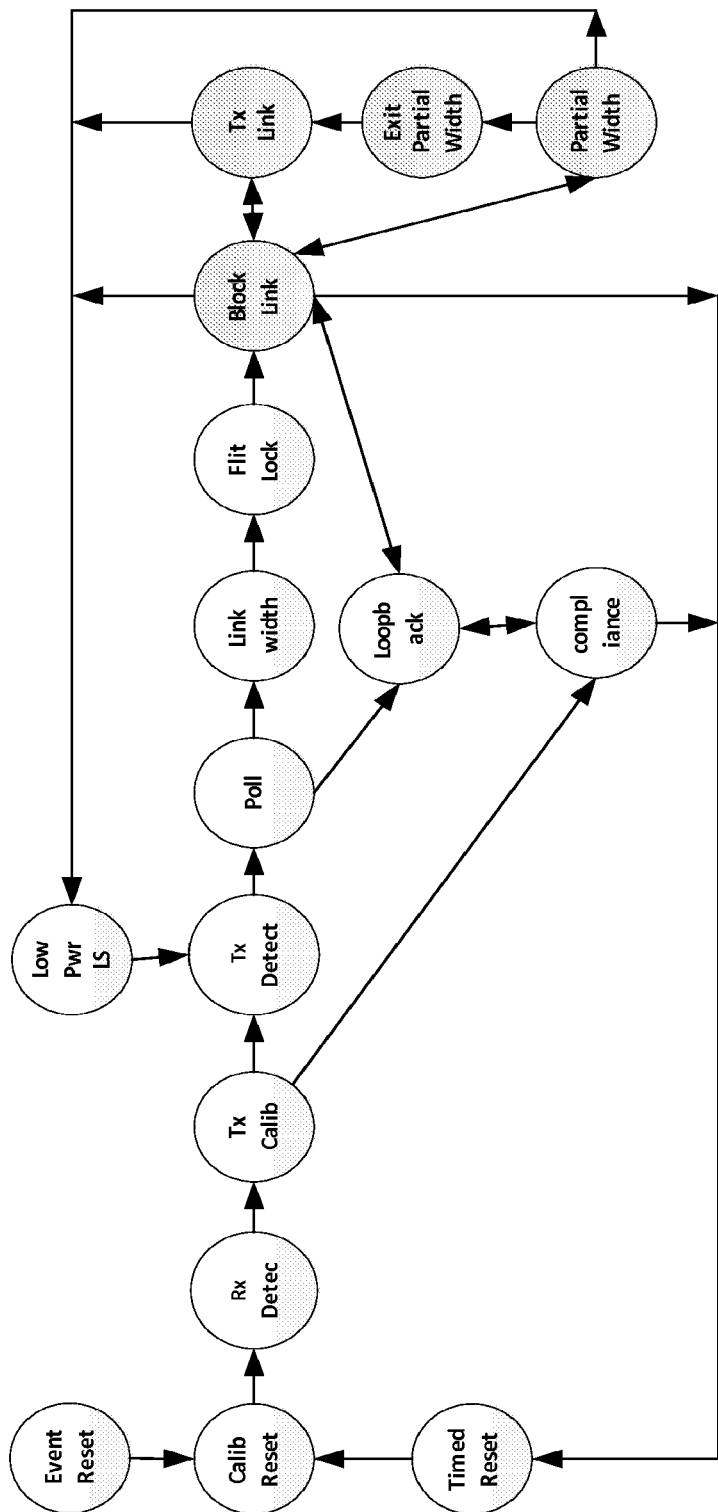
FIG. 7 illustrates a representation of an example state machine.
Figure 9:
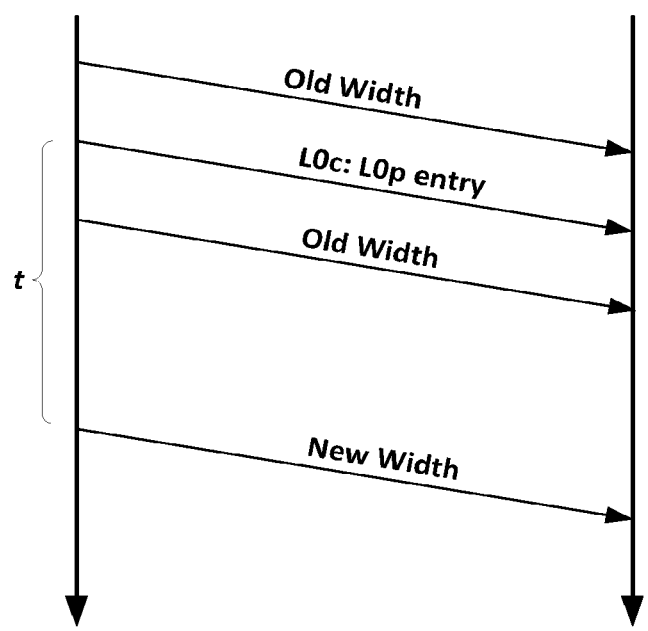
FIG. 9 illustrates a flow diagram representing an example entry into a partial width transmitting state.

FIG. 7 illustrates a representation of at least a portion of a state machine used by agents in one example implementation of HPI. It should be appreciated that the states included in the state table of FIG. 7 include a non-exhaustive listing of possible states. For instance, some transitions are omitted to simplify the diagram. Also, some states may be combined, split, or omitted, while others might be added. Such states can include:

Event reset state: entered on a warm or cold reset event. Restores default values. Initialize counters (e.g., sync counters). May exit to another state, such as another reset state.

Timed reset state: timed state for in-band reset. May drive a predefined electrical ordered set (EOS) so remote receivers are capable of detecting the EOS and entering the timed reset as well. Receiver has lanes holding electrical settings. May exit to an agent to calibrate reset state.

Calibrate reset state: calibration without signaling on the lane (e.g. receiver calibration state) or turning drivers off. May be a predetermined amount of time in the state based on a timer. May set an operational speed. May act as a wait state when a port is not enabled. May include minimum residency time. Receiver conditioning or staggering off may occur based on design. May exit to a receiver detect state after a timeout and/or completion of calibration.

Receiver detect state: detect presence of a receiver on lane(s). May look for receiver termination (e.g. receiver pulldown insertion). May exit to calibrate reset state upon a specified value being set or when another specified value is not set. May exit to transmitter calibrate state if a receiver is detected or a timeout is reached.

Transmitter calibrate state: for transmitter calibrations. May be a timed state allocated for transmitter calibrations. May include signaling on a lane. May continuously drive an EOS, such as an electric idle exit ordered set (EIEOS). May exit to compliance state when done calibrating or on expiration of a timer. May exit to transmitter detect state if a counter has expired or a secondary timeout has occurred.

Transmitter detect state: qualifies valid signaling. May be a handshake state where an agent completes actions and exits to a next state based on remote agent signaling. Receiver may qualify valid signaling from transmitter. Receiver, in one embodiment, looks for a wake detect, and if debounced on one or more lanes looks for it on the other lanes. Transmitter drives a detect signal. May exit to a polling state in response to debounce being completed for all lanes and/or a timeout or if debounce on all lanes is not complete and there is a timeout. Here, one or more monitor lanes may be kept awake to debounce a wake signal. And if debounced then the other lanes are potentially debounced. This can enable power savings in low power states.

Polling state: receiver adapts, initializes drift buffer and locks on bits/bytes (e.g. identifies symbol boundaries). Lanes may be deskewed. A remote agent may cause an exit to a next state (e.g. a Link Width State) in response to an acknowledge message. Polling can additionally include a training sequence lock by locking to an EOS and a training sequence header. Lane to lane skew at remote transmitter may be capped at a first length for top speed and a second length for slow speed. Deskew may be performed in a slow mode as well as an operational mode. Receiver may have a specific maximum to deskew lane-to-lane skew, such as 8, 16, or 32 intervals of skew. Receiver actions may include latency fixing. Receiver actions, in one embodiment, can be completed on successful deskew of a valid lane map. A successful handshake can be achieved, in one example, when a number of consecutive training sequence headers are received with acknowledgements and a number of training sequences with an acknowledge are transmitted after the receiver has completed its actions.

Link width state: agent communicates with the final lane map to remote transmitter. Receiver receives the information and decodes. Receiver may record a configured lane map in a structure after checkpoint of a previous lane map value in a second structure. Receiver may also respond with an acknowledge ("ACK"). May initiate an in-band reset. As one example, first state to initiate in-band reset. In one embodiment, exit to a next state, such as flit configuration state, is performed in response to the ACK. Further, prior to entering low power state, a reset signal may also be generated if the frequency of a wake detect signal occurrence drops below a specified value (e.g. 1 every number of unit intervals (UIs), such as 4K UI). Receiver may hold current and previous lane maps. Transmitter may use different groups of lanes based on training sequences having different values. Lane map may not modify some status registers in some embodiments.

Flitlock configuration state: entered by a transmitter but the state is considered exited (i.e. secondary timeout moot) when both transmitter and receiver have exited to a blocking link state or other link state. Transmitter exit to a link state, in one embodiment, includes start of a data sequence (SDS) and training sequence (TS) boundary after receiving a planetary alignment signal. Here, receiver exit may be based on receiving an SDS from a remote transmitter. This state may be a bridge from agent to link state. Receiver identifies SDS. Receiver may exit to blocking link state (BLS) (or a control window) if SDS received after a descrambler is initialized. If a timeout occurs, exit may be to reset state. Transmitter drives lanes with a configuration signal. Transmitter exit may be to reset, BLS, or other states based on conditions or timeouts.

Transmitting Link State: a link state. Flits are sent to a remote agent. May be entered from a blocking link state and return to a blocking link state on an event, such as a timeout. Transmitter transmits flits. Receiver receives flits. May also exit to a low power link state. In some implementations, transmitting link state (TLS) can be referred to as the L0 state.

Blocking Link State: a link state. Transmitter and receiver are operating in a unified manner. May be a timed state during which the link layer flits are held off while the Physical layer information is communicated to the remote agent. May exit to a low power link state (or other link state based on the design). A blocking link state (BLS), in one embodiment, periodically occurs. The period is referred to as a BLS interval and may be timed, as well as may differ between slow speed and operational speed. Note that the link layer may be periodically blocked from sending flits so that a Physical layer control sequence of a length may be sent, such as during a transmitting link state or a partial width transmitting link state. In some implementations, blocking link state (BLS) can be referred to as a L0 control, or L0c, state.

Figure 14:
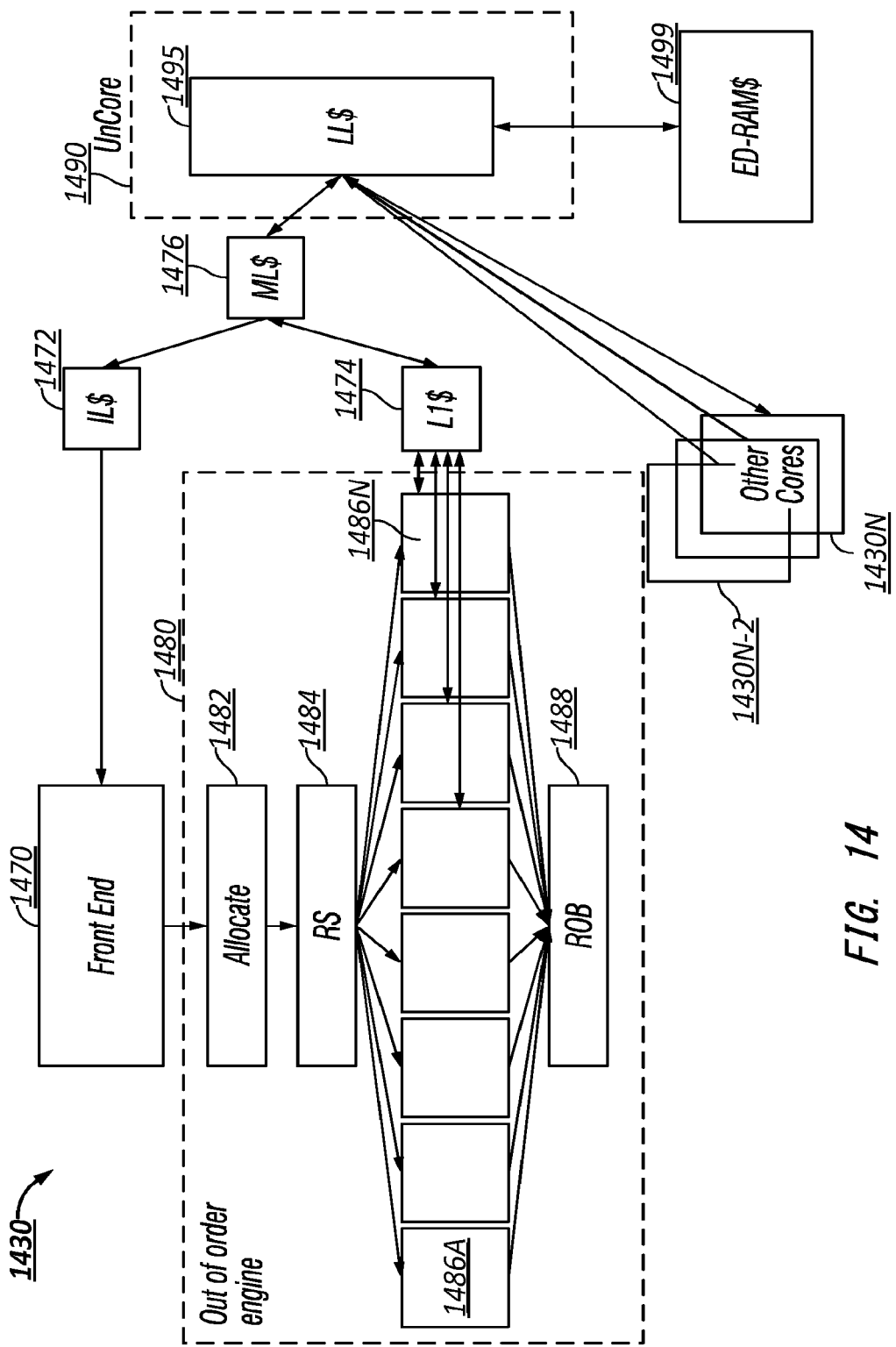
FIG. 14 illustrates an embodiment of a block diagram for a processor.

Partial Width Transmitting Link State: Link state. May save power by entering a partial width state. In one embodiment asymmetric partial width refers to each direction of a two direction link having different widths, which may be supported in some designs. An example of an initiator, such as a transmitter, sending a partial width indication to enter partial width transmitting link state is shown in the example of FIG. 14. Here, a partial width indication is sent while transmitting on a link with a first width to transition the link to transmit at a second, new width. A mismatch may result in a reset. Note that speeds may not be altered but width may be. Therefore, flits are potentially sent at different widths. May be similar to a transmitting link state logically; yet, since there is a smaller width, it may take longer to transmit flits. May exit to other link states, such as a low power link state based on certain received and sent messages or an exit of the partial width transmitting link state or a link blocking state based on other events. In one embodiment, a transmitter port may turn idle lanes off in a staggered manner to provide better signal integrity (i.e. noise mitigation). Here, non-retry-able flits, Such as Null flits, may be utilized during periods where the link width is changing. A corresponding receiver may drop these null flits and turn idle lanes off in a staggered manner, as well as record the current and previous lane maps in one or more structures. Note status and associated status register may remain unaltered. In some implementations, partial width transmitting link state can be referred to as a partial L0, or L0p, state.

Exit Partial Width Transmitting Link State: exit the partial width state. May or may not use a blocking link state in some implementations. The transmitter initiates exit, in one embodiment, by sending partial width exit patterns on the idle lanes to train and deskew them. As one example, an exit pattern start with EIEOS, which is detected and debounced to signal that the lane is ready to start the entry to a full transmitting link state, and may end with SDS or Fast Training Sequence (FTS) on idle lanes. Any failure during the exit sequence (receiver actions, such as deskew not completed prior to timeout) stops flit transfers to the link layer and asserts a reset, which is handled by resetting the link on the next blocking link state occurrence. The SDS may also initialize the scrambler/descrambler on the lanes to appropriate values.

Low Power Link State: is a lower power state. In one embodiment, it is lower power than the partial width link state, since signaling in this embodiment is stopped on all lanes and in both directions. Transmitters may use a blocking link state for requesting a low power link state. Here, receiver may decode the request and respond with an ACK or a NAK; otherwise reset may be triggered. In some implementations, low power link state can be referred to as a L1 state.

In some implementations, state transitions can be facilitated to allow states to be bypassed, for instance, when state actions of the states, such as certain calibrations and configurations, have already been completed. Previous state results and configurations of a link can be stored and reused in subsequent initializations and configurations of a link. Rather than repeating such configurations and state actions, corresponding states can be bypassed. Traditional systems implementing state bypasses, however, often implement complex designs and expensive validation escapes. Rather than using a traditional bypass, in one example, HPI can utilize short timers in certain states, such as where the state actions do not need to be repeated. This can potentially allow for more uniform and synchronized state machine transitions among other potential advantages.

In one example, a software-based controller (e.g., through an external control point for the Physical layer) can enable a short timer for one or more particular states. For instance, for a state for which actions have already been performed and stored, the state can be short-timed to facilitate a quick exit from the state to a next state. If, however, the previous state action fails or cannot be applied within the short timer duration, a state exit can be performed. Further, the controller can disable the short timer, for instance, when the state actions should be performed anew. A long, or default, timer can be set for each respective state. If configuration actions at the state cannot be completed within the long timer, a state exit can occur. The long timer can be set to a reasonable duration so as to allow completion of the state actions. The short timer, in contrast, may be considerably shorter making it, in some cases, impossible to perform the state actions without reference back to previously-performed state actions, among other examples.

In some implementations of HPI, supersequences can be defined, each supersequence corresponding to a respective state or entry/exit to/from the respective state. A supersequence can include a repeating sequence of data sets and symbols. The sequences can repeat, in some instances, until completion of a state or state transition, or communication of a corresponding event, among other examples. In some instances, the repeating sequence of a supersequence can repeat according to a defined frequency, such as a defined number of unit intervals (UIs). A unit interval (UI) can correspond to the interval of time for transmitting a single bit on a lane of a link or system. In some implementations, the repeating sequence can begin with an electrically ordered set (EOS). Accordingly, an instance of the EOS can be expected to repeat in accordance with the predefined frequency. Such ordered sets can be implemented as defined 16 Byte codes that may be represented in hexadecimal format, among other examples. In one example, the EOS of a supersequence can be an electric idle ordered set (or EIEIOS). In one example, an EIEOS can resemble a low frequency clock signal (e.g., a predefined number of repeating FF00 or FFF000 hexadecimal symbols, etc.). A predefined set of data can follow the EOS, such as a predefined number of training sequences or other data. Such supersequences can be utilized in state transitions including link state transitions as well as initialization, among other examples.

As introduced above, initialization, in one embodiment, can be done initially at slow speed followed by initialization at fast speed. Initialization at slow speed uses the default values for the registers and timers. Software then uses the slow speed link to setup the registers, timers and electrical parameters and clears the calibration semaphores to pave the way for fast speed initialization. As one example, initialization can consist of such states or tasks as Reset, Detect, Polling, and Configuration, among potentially others.

In one example, a link layer blocking control sequence (i.e. a blocking link state (BLS) or L0c state) can include a timed state during which the link layer flits are held off while the PHY information is communicated to the remote agent. Here, the transmitter and receiver may start a block control sequence timer. And upon expiration of the timers, the transmitter and receiver can exit the blocking state and may take other actions, such as exit to reset, exit to a different link state (or other state), including states that allow for the sending of flits across the link.

In one embodiment, link training can be provided and include the sending of one or more of scrambled training sequences, ordered sets, and control sequences, such as in connection with a defined supersequence. A training sequence symbol may include one or more of a header, reserved portions, a target latency, a pair number, a physical lane map code reference lanes or a group of lanes, and an initialization state. In one embodiment, the header can be sent with a ACK or NAK, among other examples. As an example, training sequences may be sent as part of supersequences and may be scrambled.

In one embodiment, ordered sets and control sequences are not scrambled or staggered and are transmitted identically, simultaneously and completely on all lanes. A valid reception of an ordered set may include checking of at least a portion of the ordered set (or entire ordered set for partial ordered sets). Ordered sets may include an electrically ordered set (EOS), such as an Electrical Idle Ordered Set (EIOS) or an EIEOS. A supersequence may include a start of a data sequence (SDS) or a Fast Training Sequence (FTS). Such sets and control supersequences can be predefined and may have any pattern or hexadecimal representation, as well as any length. For example, ordered sets and supersequences may be a length of 8 bytes, 16, bytes, or 32 bytes, etc. FTS, as an example, can additionally be utilized for fast bit lock during exit of a partial width transmitting link state. Note that the FTS definition may be per lane and may utilize a rotated version of the FTS.

Supersequences, in one embodiment, can include the insertion of an EOS, such as an EIEOS, in a training sequence stream. When signaling starts, lanes, in one implementation, power-on in a staggered manner. This may result, however, in initial supersequences being seen truncated at the receiver on some lanes. Supersequences can be repeated however over short intervals (e.g., approximately one-thousand unit intervals (or ~1 KUI)). The training supersequences may additionally be used for one or more of deskew, configuration and for communicating initialization target, lane map, etc. The EIEOS can be used for one or more of transitioning a lane from inactive to active state, screening for good lanes, identifying symbol and TS boundaries, among other examples.

Turning to FIG. 8, representations of example supersequences are shown. For instance, an exemplary Detect supersequence 805 can be defined. The Detect supersequence 805 can include a repeating sequence of a single EIEOS (or other EOS) followed by a predefined number of instances of a particular training sequence (TS). In one example, the EIEOS can be transmitted, immediately followed by seven repeated instances of TS. When the last of the seven TSes is sent the EIEOS can be sent again followed by seven additional instances of TS, and so on. This sequence can be repeated according to a particular predefined frequency. In the example of FIG. 8, the EIEOS can reappear on the lanes approximately once every one thousand UIs (~1 KUI) followed by the remainder of the Detect supersequence 805. A receiver can monitor lanes for the presence of a repeating Detect supersequence 805 and upon validating the supersequence 705 can conclude that a remote agent is present, has been added (e.g., hot plugged) on the lanes, has awoke, or is reinitializing, etc.

In another example, another supersequence 810 can be defined to indicate a polling, configuration, or loopback condition or state. As with the example Detect supersequence 805, lanes of a link can be monitored by a receiver for such a Poll/Config/Loop supersequence 810 to identify a polling state, configuration state, or loopback state or condition. In one example, a Poll/Config/Loop supersequence 810 can begin with an EIEOS followed by a predefined number of repeated instances of a TS. For instance, in one example the EIEOS can be followed by thirty-one (31) instances of TS with the EIEOS repeating approximately every four thousand UI (e.g., ~4 KUI).

Further, in another example, a partial width transmitting state (PWTS) exit supersequence 815 can be defined. In one example, a PWTS exit supersequence can include an initial EIEOS to repeat to pre-condition lanes in advance of the sending of the first full sequence in the supersequence. For instance, the sequence to be repeated in supersequence 815 can begin with an EIEOS (to repeat approximately once every 1 KUI). Further, fast training sequences (FTS) can be utilized in lieu of other training sequences (TS), the FTS configured to assist in quicker bit lock, byte lock, and deskewing. In some implementations, an FTS can be unscrambled to further assist in bringing idle lanes back to active as quickly and non-disruptively as possible. As with other supersequences preceding an entry into a link transmitting state, the supersequence 815 can be interrupted and ended through the sending of a start of data sequence (SDS). Further, a partial FTS (FTSp) can be sent to assist in synchronizing the new lanes to the active lanes, such as by allowing bits to be subtracted (or added) to the FTSp, among other examples.

Supersequences, such as Detect supersequence 705 and Poll/Config/Loop supersequence 710, etc. can potentially be sent substantially throughout the initialization or re-initialization of a link. A receiver, upon receiving and detecting a particular supersequence can, in some instances, respond by echoing the same supersequence to the transmitter over the lanes. The receiving and validation of a particular supersequence by transmitter and receiver can serve as a handshake to acknowledge a state or condition communicated through the supersequence. For instance, such a handshake (e.g., utilizing a Detect supersequence 705) can be used to identify reinitialization of a link. In another example, such a handshake can be utilized to indicate the end of an electrical reset or low power state, resulting in corresponding lanes being brought back up, among other examples. The end of the electrical reset can be identified, for instance, from a handshake between transmitter and receiver each transmitting a Detect supersequence 705.

In another example, lanes can be monitored for supersequences and use the supersequences in connection with the screening of lanes for detect, wake, state exits and entries, among other events. The predefined and predictable nature and form of supersequences can be further used to perform such initialization tasks as bit lock, byte lock, debouncing, descrambling, deskewing, adaptation, latency fixing, negotiated delays, and other potential uses. Indeed, lanes can be substantially continuously monitored for such events to quicken the ability of the system to react to and process such conditions.

In the case of debouncing, transients can be introduced on lanes as a result of a variety of conditions. For instance, the addition or powering-on of a device can introduce transients onto the lane. Additionally, voltage irregularities can be presented on a lane because of poor lane quality or electrical failure. In some cases "bouncing" on a lane can produce false positives, such as a false EIEOS. However, in some implementations, while supersequences can be begin with an EIEOS, defined supersequences can further include additional sequences of data as well as a defined frequency at which the EIEOS will be repeated. As a result, even where a false EIEOS appears on a lane, a logic analyzer at the receiver can determine that the EIEOS is a false positive by validating data that succeeds the false EIEOS. For instance, if expected TS or other data does not follow the EIEOS or the EIEOS does not repeat within a particular one of the predefined frequencies of one of the predefined supersequences, the receiver logic analyzer can fail validation of the received EIEOS. As bouncing can occur at start up as a device is added to a line, false negatives can also result. For instance, upon being added to a set of lanes, a device can begin sending a Detect supersequence 705 to alert the other side of the link of its presence and begin initialization of the link. However, transients introduced on the lanes may corrupt the initial EIEOS, TS instances, and other data of the supersequence. However, a logic analyzer on the receiving device can continue to monitor the lanes and identify the next EIEOS sent by the new device in the repeating Detect supersequence 705, among other examples.

In some implementations, an HPI link is capable of operating at multiple speeds facilitated by the embedded clock. For instance, a slow mode can be defined. In some instances, the slow mode can be used to assist in facilitating initialization of a link. Calibration of the link can involve software-based controllers providing logic for setting various calibrated characteristics of the link including which lanes the link is to use, the configuration of the lanes, the operational speed of the link, synchronization of the lanes and agents, deskew, target latency, among other potential characteristics. Such software-based tools can make use of external control points to add data to Physical layer registers to control various aspects of the Physical layer facilities and logic.

Operational speed of a link can be considerably faster than the effective operation speed of software-based controllers utilized in initialization of the link. A slow mode can be used to allow use of such software-based controllers, such as during initialization or re-initialization of the link among other instances. Slow mode can be applied on lanes connecting a receiver and transmitted, for instance, when a link is turned on, initialized, reset, etc. to assist in facilitating calibration of the link.

In one embodiment, the clock can be embedded in the data so there are no separate clock lanes. Flits can be sent according to the embedded clock. Further, the flits sent over the lanes can be scrambled to facilitate clock recovery. The receiver clock recovery unit, as one example, can deliver sampling clocks to a receiver (i.e. the receiver recovers clock from the data and uses it to sample the incoming data). Receivers in some implementations continuously adapt to an incoming bit stream. By embedding the clock, pinout can be potentially reduced. However, embedding the clock in the in-band data can alter the manner in which in-band reset is approached. In one embodiment, a blocking link state (BLS) can be utilized after initialization. Also, electrical ordered set supersequences may be utilized during initialization to facilitate the reset, among other considerations. The embedded clock can be common between the devices on a link and the common operational clock can be set during calibration and configuration of the link. For instance, HPI links can reference a common clock with drift buffers. Such implementation can realize lower latency than elastic buffers used in non-common reference clocks, among other potential advantages. Further, the reference clock distribution segments may be matched to within specified limits.

As noted above, an HPI link can be capable of operating at multiple speeds including a "slow mode" for default power-up, initialization, etc. The operational (or "fast") speed or mode of each device can be statically set by BIOS. The common clock on the link can be configured based on the respective operational speeds of each device on either side of the link. For instance, the link speed can be based on the slower of the two device operations speeds, among other examples. Any operational speed change may be accompanied by a warm or cold reset.

In some examples, on power-on, the link initializes to Slow Mode with transfer rate of, for example, 100 MT/s. Software then sets up the two sides for operational speed of the link and begins the initialization. In other instances, a sideband mechanism can be utilized to set up a link including the common clock on the link, for instance, in the absence or unavailability of a slow mode.

A slow mode initialization phase, in one embodiment, can use the same encoding, scrambling, training sequences (TS), states, etc. as operational speed but with potentially fewer features (e.g., no electrical parameter setup, no adaptation, etc.). Slow mode operation phase can also potentially use the same encoding, scrambling etc. (although other implementations may not) but may have fewer states and features compared to operational speed (e.g., no low power states).

Further, slow mode can be implemented using the native phase lock loop (PLL) clock frequency of the device. For instance, HPI can support an emulated slow mode without changing PLL clock frequency. While some designs may use separate PLLs for slow and fast speed, in some implementations of HPI emulated slow mode can be achieved by allowing the PLL clock to runs at the same fast operational speed during slow mode. For instance, a transmitter can emulate a slower clock signal by repeating bits multiple times so as to emulate a slow high clock signal and then a slow low clock signal. The receiver can then oversample the received signal to locate edges emulated by the repeating bits and identify the bit. In such implementations, ports sharing a PLL may coexist at slow and fast speeds.

In some implementations of HPI, adaptation of lanes on a link can be supported. The Physical layer can support both receiver adaptation and transmitter, or sender, adaptation. With receiver adaptation, the transmitter on a lane can send sample data to the receiver which the receiver logic can process to identify shortcomings in the electrical characteristics of the lane and quality of the signal. The receiver can then make adjustments to the calibration of the lane to optimize the lane based on the analysis of the received sample data. In the case of transmitter adaptation, the receiver can again receive sample data and develop metrics describing the quality of the lane but in this case communicate the metrics to the transmitter (e.g., using a backchannel, such as a software, hardware, embedded, sideband or other channel) to allow the transmitter to make adjustments to the lane based on the feedback.

As both devices on a link can run off the same reference clock (e.g., ref clk), elasticity buffers can be omitted (any elastic buffers may be bypassed or used as drift buffers with lowest possible latency). However, phase adjustment or drift buffers can be utilized on each lane to transfer the respective receiver bitstream from the remote clock domain to the local clock domain. The latency of the drift buffers may be sufficient to handle sum of drift from all sources in electrical specification (e.g., voltage, temperature, the residual SSC introduced by reference clock routing mismatches, and so on) but as small as possible to reduce transport delay. If the drift buffer is too shallow, drift errors can result and manifest as series of CRC errors. Consequently, in some implementations, a drift alarm can be provided which can initiate a Physical layer reset before an actual drift error occurs, among other examples.

Some implementations of HPI may support the two sides running at a same nominal reference clock frequency but with a ppm difference. In this case frequency adjustment (or elasticity) buffers may be needed and can be readjusted during an extended BLS window or during special sequences which would occur periodically, among other examples.

Some systems and devices utilizing HPI can be deterministic such that their transactions and interactions with other systems, including communications over an HPI link, are synchronized with particular events on the system or device. Such synchronization can take place according to a planetary alignment point or signal corresponding to the deterministic events. For instance, a planetary alignment signal can be used to synchronize state transitions, including entry into a link transmitting state, with other events on the device. In some instances, sync counters can be employed to maintain alignment with a planetary alignment of a device. For instance, each agent can include a local sync counter which is initialized by a planetary aligned signal (i.e., common and simultaneous (except for fixed skew) to all agents/layers which are in sync). This sync counter can count alignment points correctly even in powered down or low-power states (e.g., L1 state) and can be used to time the initialization process (after reset or L1 exit), including the boundaries (i.e., beginning or end) of an EIEOS (or other EOS) included in a supersequence utilized during initialization. Such supersequences can be fixed in size and greater than max possible latency on a link. EIEOS-TS boundaries in a supersequence can thus be used as a proxy for a remote sync counter value.

Further, HPI can support master-slave models where a deterministic master device or system can drive timing of interaction with another device according to its own planetary alignment moments. Further, in some examples, master-master determinism can be supported. Master-master or master slave determinism can ensures that two or more link-pairs can be in lock-step at the Link layer and above. In master-master determinism, each direction's exit from initialization can be controlled by respective transmitter. In the case of master-slave determinism, a master agent can controls the determinism of the link pair (i.e., in both directions) by making a slave transmitter initialization exit wait for its receiver to exit initialization, for instance, among other potential examples and implementations.

In some implementations, a synchronization (or "sync") counter can be utilized in connection with maintaining determinism within an HPI environment. For instance, a sync counter may be implemented to count a defined amount, such as 256 or 512 UI. This sync counter may be reset by an asynchronous event and may count continuously (with rollover) from then (potentially even during a low power link state). Pin-based resets (e.g., power on reset, warm reset) may be synchronizing events that reset a sync counter, among other example. In one embodiment, these events can occur at two sides with skew less (and, in many cases, much less) than the sync counter value. During initialization, the start of the transmitted exit ordered set (e.g., EIEOS) preceding a training sequence of a training supersequence may be aligned with the reset value of the sync counter (e.g., sync counter rollover). Such sync counters can be maintained at each agent on a link so as to preserve determinism through maintaining constant latency of flit transmissions over a particular link.

Control sequences and codes, among other signals, can be synchronized with a planetary alignment signal. For instance, EIEOS sequences, BLS or L0c windows (and included codes), SDSes, etc. can be configured to be synchronized to a planetary alignment. Further, synchronization counters can be reset according to an external signal, such as a planetary alignment signal from a device so as to itself be synchronized with the planetary alignment, among other examples.

Sync counters of both agents on a link can be synchronized. Resetting, initializing, or re-initialization of a link can include a reset of the sync counters to realign the sync counters with each other and/or an external control signal (e.g., a planetary alignment signal). In some implementations, sync counters may only be reset through an entry into a reset state. In some instances, determinism can be maintained, such as in a return to an L0 state, without a reset of the sync counter. Instead, other signals already tuned to a planetary alignment, or other deterministic event can be used as a proxy for a reset. In some implementations, an EIEOS can be used in a deterministic state entry. In some instances, the boundary of the EIEOS and an initial TS of a supersequence can be used to identify a synchronization moment and synchronize sync counters of one of the agents on a link. The end of an EIEOS can be used, for instance, to avoid the potential of transients corrupting the start boundary of the EIEOS, among other examples.

Latency fixing can also be provided in some implementations of HPI. Latency can include not only the latency introduced by the transmission line used for communication of flits, but also the latency resulting from processing by the agent on the other side the link. Latency of a lane can be determined during initialization of the link. Further, changes in the latency can also be determined. From the determined latency, latency fixing can be initiated to compensate for such changes and return the latency expected for the lane to a constant, expected value. Maintaining consistent latency on a lane can be critical to maintaining determinism in some systems.

Latency can be fixed at a receiver link layer to a programmed value in some implementations using a latency buffer in conjunction with determinism and enabled by starting a detect (e.g., by sending a Detect supersequence) on a sync counter rollover. Accordingly, in one example, a transmitted EIEOS (or other EOS) in Polling and configuration can occur on a sync counter rollover. In other words, the EIEOS can be precisely aligned with the sync counter, such that a synchronized EIEOS (or other EOS) can serve as a proxy, in some instances, for the sync counter value itself, at least in connection with certain latency fixing activities. For instance, a receiver can add enough latency to a received EIEOS so that it meets the dictated target latency at the Physical layer-Link layer interface. As an example, if the target latency is 96 UI and the receiver EIEOS after deskew is at sync count 80 UI, 16 UI of latency can be added. In essence, given the synchronization of an EIEOS, latency of a lane can be determined based on the delay between when the EIEOS was known to be sent (e.g., at a particular sync counter value) and when the EIEOS was received. Further, latency can be fixed utilizing the EIEOS (e.g., by adding latency to the transmission of an EIEOS to maintain a target latency, etc.).

Latency fixing can be used within the context of determinism to permit an external entity (such as an entity providing a planetary alignment signal) to synchronize the physical state of two agents across the link in two directions. Such a feature can be used, for example, in debugging problems in the field and for supporting lock-step behavior. Accordingly, such implementations can include external control of one or more signals that may cause the Physical layer to transition to a transmitting link state (TLS) on two agents. Agents possessing determinism capabilities can exit initialization on a TS boundary, which is also potentially the clean flit boundary when or after the signal is asserted. Master-slave determinism may allow a master to synchronize the Physical layer state of master and slave agents across the link in both directions. If enabled, the slave transmitter exit from initialization can depend on (e.g., follow or be coordinated with) its receiver exit from initialization (in addition to other considerations based on determinism). Agents which have Determinism capability may additionally possess functionality for entering a BLS or L0c window on a clean flit, among other examples.

Determinism may also be referred to as automated test equipment (ATE) when used to synchronize test patterns on ATE with a device under test (DUT) controlling physical and link layer state by fixing latency at the receiver link layer to a programmed value using a latency buffer.

In some implementations, determinism in HPI can include facilitating the ability of one agent to determine and apply a delay based on a deterministic signal. A master can send an indication of a target latency to a remote agent. The remote agent can determine actual latency on a lane and apply a delay to adjust the latency to meet the target latency (e.g., identified in a TS). Adjusting the delay or latency can assist in facilitating the eventual synchronized entry into a link transmitting state at a planetary alignment point. A delay value can be communicated by a master to a slave, for instance, in a TS payload of a supersequence. The delay can specify a particular number UIs determined for the delay. The slave can delay entry into a state based on the determined delay. Such delays can be used, for instance, to facilitate testing, to stagger L0c intervals on lanes of a link, among other examples.

As noted above, a state exit can be take place according to a planetary alignment point. For instance, an SDS can be sent to interrupt a state supersequence can to drive transition from the state to another state. The sending of the SDS can be timed to coincide with a planetary alignment point and, in some cases, in response to a planetary alignment signal. In other instances, the sending of an SDS can be synchronized with a planetary alignment point based on a sync counter value or other signal synchronized to the planetary alignment. An SDS can be sent at any point in a supersequence, in some cases, interrupting a particular TS or EIEOS, etc. of the supersequence. This can ensure that the state transitions with little delay while retaining alignment with a planetary alignment point, among other examples.

In some implementations, HPI may support flits with a width that is, in some cases, not a multiple of the nominal lane width (e.g. using a flit width of 192 bits and 20 lanes as a purely illustrative example). Indeed, in implementations permitting partial width transmitting states, the number of lanes over which flits are transmitted can fluctuate, even during the life of the link. For example, in some instances, the flit width may be a multiple of the number of active lanes at one instant but not be a multiple of the number of active lanes at another instant (e.g., as the link changes state and lane width). In instances where the number of lanes is not a multiple of a current lane width (e.g., the example of a flit width of 192 bits on 20 lanes), in some embodiments, consecutive flits can be configured to be transmitted to overlap on lanes to thereby preserve bandwidth (e.g., transmitting five consecutive 192 bit flits overlapped on the 20 lanes).

Figure 10:
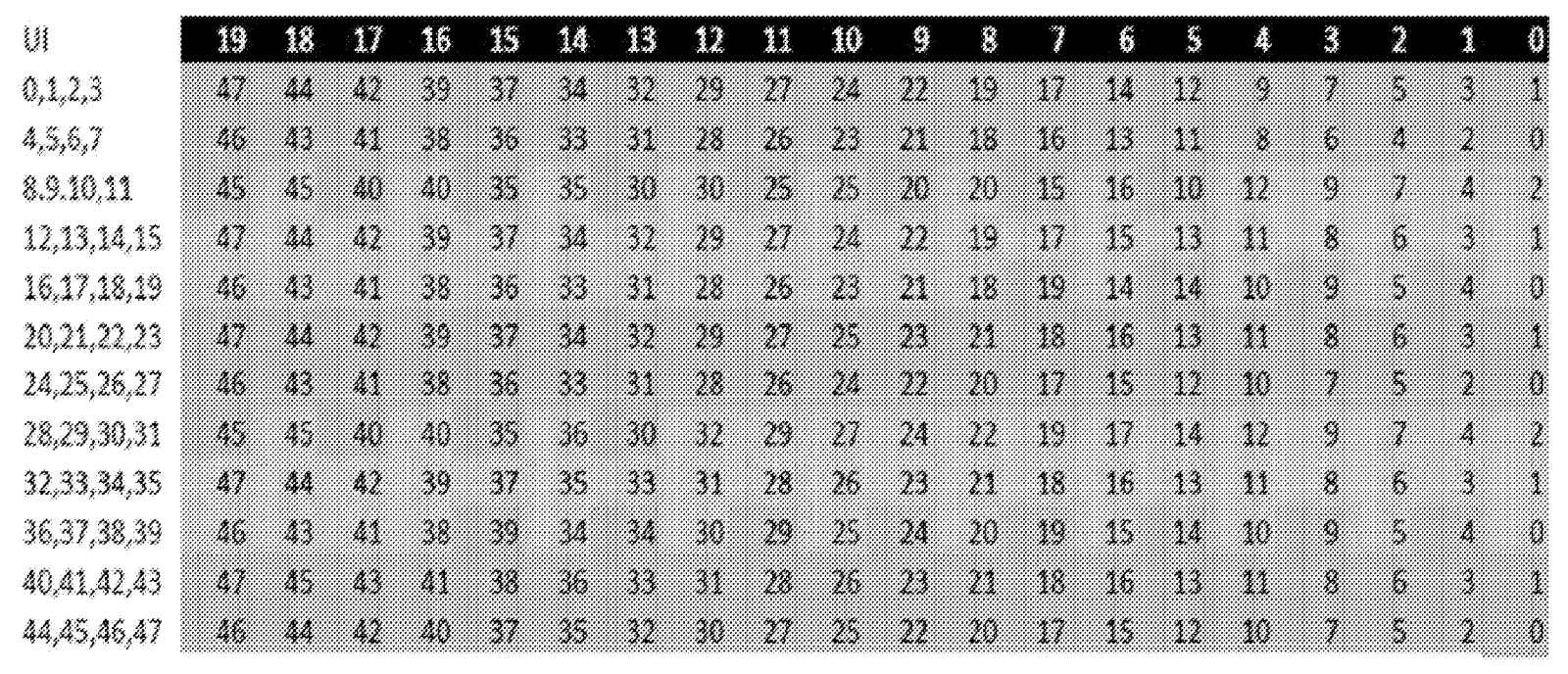

FIG. 10 illustrates a representation of transmission of consecutive flits overlapped on a number of lanes. For instance, FIG. 10 shows a representation of five overlapping 192-bit flits sent over a 20 lane link (the lanes represented by columns 0-19). Each cell of FIG. 10 represents a respective "nibble" or grouping of four bits (e.g., bits 4n+3:4n) included in a flit sent over a 4 UI span. For instance, a 192 bit flit can be divided into 48 four-bit nibbles. In one example, nibble 0 includes bits 0-3, nibble 1 includes bits 4-7, etc. The bits in the nibbles can be sent so as to overlap, or be interleaved (e.g., "swizzled"), such that higher-priority fields of the flit are presented earlier, error detection properties (e.g., CRC) are retained, among other considerations. Indeed, a swizzling scheme can also provide that some nibbles (and their respective bits) are sent out of order (e.g., as in the examples of FIGS. 10 and 11). In some implementations, a swizzling scheme can be dependent on the architecture of the link layer and format of the flit used in the link layer.

The bits (or nibbles) of a flit with a length that is not a multiple of the active lanes can be swizzled, such as according to the example of FIG. 10. For instance, during the first 4 UI, nibbles 1, 3, 5, 7, 9, 12, 14, 17, 19, 22, 24, 27, 29, 32, 34, 37, 39, 42, 44 and 47 can be sent. Nibbles 0, 2, 4, 6, 8, 11, 13, 16, 18, 21, 23, 26, 28, 31, 33, 36, 38, 41, 43, and 46 can be sent during the next 4 UI. In UIs 8-11, only eight nibbles remain of the first flit. These final nibbles (i.e., 10, 15, 20, 25, 30, 40, 45) of the first flit can be sent concurrently with the first nibbles (i.e., nibbles 2, 4, 7, 9, 12, 16, 20, 25, 30, 35, 40, 45) of the second flit, such that the first and second flits overlap or are swizzled. Using such a technique, in the present example, five complete flits can be sent in 48 UI, with each flit sent over a fractional 9.6 UI period.

In some instances, swizzling can result in periodic "clean" flit boundaries. For instance, in the example of FIG. 10, the starting 5-flit boundary (the top line of the first flit) may also be referred to as a clean flit boundary since all lanes are transmitting starting nibble from same flit. Agent link layer logic can be configured to identify swizzling of lanes and can reconstruct the flit from the swizzled bits. Additionally, physical layer logic can include functionality for identifying when and how to swizzle a stream of flit data based on the number of lanes being used at the moment. Indeed, in a transition from one link width state to another, agents can configure themselves to identify how swizzling of the data stream will be employed. Indeed, both sides of the link can identify the scheme to be used for swizzling of a data stream so as to identify how a link width state transition will affect the stream. In some implementations, in order to facilitate a link width state transition at a jagged edge of a flit, the length of a partial FTS (FTSp) can be tailored such that the signaling exit is synchronized, among other examples. Further, physical layer logic can be configured to maintain determinism in spite of jagged flit boundaries resulting from swizzling, among other features.

As noted above, links can transition between lane widths, in some instances operating at an original, or full, width and later transitioning to (and from) a partial width utilizing fewer lanes. In some instances, the defined width of a flit may be divisible by the number of lanes. For instance, the example of FIG. 11 illustrates such an example, where the 192-bit flit of the previous examples is transmitted over an 8-lane link. As represented in FIG. 11, 4-bit nibbles of a 192-bit flit can be evenly distributed and transmitted over 8 lanes (i.e., as 192 is a multiple of 8). Indeed, a single flit may be sent over 24 UI when operating at an 8-lane partial width. Further, each flit boundary can be clean in the example of FIG. 11. While clean flit boundaries can simplify the state transitions, determinism, and other features, allowing for swizzling and occasional jagged flit boundaries can allow for the minimization of wasted bandwidth on a link.

Additionally, while the example of FIG. 11, shows lanes 0-7 as the lanes that remained active in a partial width state, any set of 8 lanes can potentially be used. Note also that the examples above are for purposes of illustration only. The flits can potentially be defined to have any width. Links can also have potentially any link width. Further, the swizzling scheme of a system can be flexibly constructed according to the formats and fields of the flit, the preferred lane widths in a system, among other considerations and examples.

The operation of the HPI PHY logical layer can be independent of the underlying transmission media provided the latency does not result in latency fixing errors or timeouts at the link layer, among other considerations.

External interfaces can be provided in HPI to assist in management of the Physical layer. For instance, external signals (from pins, fuses, other layers), timers, control and status registers can be provided. The input signals may change at any time relative to PHY state but are to be observed by the Physical layer at specific points in a respective state. For example, a changing alignment signal (as introduced below) may be received but have no effect after the link has entered a transmitting link state, among other examples. Similarly command register values can be observed by Physical layer entities only at specific points in time. For instance, Physical layer logic can take a snapshot of the value and use it in subsequent operations. Consequently, in some implementations, updates to command registers may be associated with a limited subset of specific periods (e.g., in a transmitting link state or when holding in Reset calibration, in slow mode transmitting link state) to avoid anomalous behavior.

Since status values track hardware changes, the values read may depend on when they are read. Some status values, however, such as link map, latency, speed, etc., may not change after initialization. For instance, a re-initialization (or low power link state (LPLS), or L1 state, exit) is the only thing which may cause these to change (e.g., a hard lane failure in a TLS may not result in reconfiguration of link until re-initialization is triggered, among other examples).

Interface signals can include signals that are external to but affect Physical layer behavior. Such interface signals can include, as examples, encoding and timing signals. Interface signals can be design specific. These signals can be an input or output. Some interface signals, such as termed semaphores and prefixed EO among other examples, can be active once per assertion edge, i.e., they may be deasserted and then reasserted to take effect again, among other examples. For instance, Table 1 includes an example listing of example functions:

TABLE 1

| Function |
| --- |
| input pin reset (aka warm reset) |
| input pin reset (aka cold reset) |
| input in-band reset pulse; causes semaphore to be set; semaphore is |

TABLE 1-continued

| Function |
| --- |
| cleared when in-band reset occurs |
| input enables low power states |
| input loopback parameters; applied for loopback pattern |
| input to enter PWLTS |
| input to exit PWLTS |
| input to enter LPLS |
| input to exit LPLS |
| input from idle exit detect (aka squelch break) |
| input enables use of CPhyInitBegin |
| input from local or planetary alignment for transmitter to exit initialization |
| output when remote agent NAKs LPLS request |
| output when agent enters LPLS |
| output to link layer to force non-retryable flits |
| output to link layer to force NULL flits |
| output when transmitter is in partial width link transmitting state (PWLTS) |
| output when receiver is in PWLTS |

CSR timer default values can be provided in pairs—one for slow mode and one for operational speed. In some instances, the value 0 disables the timer (i.e., timeout never occurs). Timers can include those shown in Table 2, below. Primary timers can be used to time expected actions in a state. Secondary timers are used for aborting initializations which are not progressing or for making forward state transitions at precise times in an automated test equipment (or ATE) mode. In some cases, secondary timers can be much larger than the primary timers in a state. Exponential timer sets can be suffixed with exp and the timer value is 2 raised to the field value. For linear timers, the timer value is the field value. Either timer could use different granularities. Additionally, some timers in the power management section can be in a set called a timing profile. These can be associated with a timing diagram of the same name.

TABLE 2

| Timers |
| --- |
| Table Tpriexp Set |
| Reset residency for driving EIEOS |
| Receiver calibration minimum time; for stagger transmitter off |
| Transmitter calibration minimum time; for stagger on |
| Tsecexp Set |
| Timed receiver calibration |
| Timed transmitter calibration |
| Squelch exit detect/debounce |
| DetectAtRx overhang for handshake |
| Adapt + bitlock/bytelock/deskew |
| Configure link widths |
| Wait for planetary aligned clean flit boundary |
| Re-bytelock/deskew |
| Tdebugexp Set |
| For hot plug; non-0 value to debug hangs |
| TBLSentry Set |
| BLS entry delay - fine |
| BLS entry delay - coarse |
| TBLS Set |
| BLS duration for transmitter |
| BLS duration for receiver |
| BLS clean flit interval for transmitter |
| TBLS clean flit interval for receiver |

Command and control registers can be provided. Control registers can be late action and may be read or written by software in some instances. Late-action values can take effect (e.g., pass through from software-facing to hardware-facing stage) continuously in Reset. Control semaphores (prefixed CP) are RW1S and can be cleared by hardware. Control registers may be utilized to perform any of the items described herein. They may be modifiable and accessible by hardware, software, firmware, or a combination thereof.

Status registers can be provided to track hardware changes (written and used by hardware) and can be read-only (but debug software may also be able to write to them). Such registers may not affect interoperability and can be typically complemented with many private status registers. Status semaphores (prefixed SP) can be mandated since they may be cleared by software to redo the actions which set the status. Default means initial (on reset) values can be provided as a subset of these status bits related to initialization. On an initialization abort, this register can be copied into a storage structure.

Tool Box registers can be provided. For instance, testability tool-box registers in the Physical layer can provide pattern generation, pattern checking and loop back control mechanisms. Higher-level applications can make use of these registers along with electrical parameters to determine margins. For example, Interconnect built in test may utilize this tool-box to determine margins. For transmitter adaptation, these registers can be used in conjunction with the specific registers described in previous sections, among other examples.

In some implementations, HPI supports Reliability, Availability, and Serviceability (RAS) capabilities utilizing the Physical layer. In one embodiment, HPI supports hot plug and remove with one or more layers, which may include software. Hot remove can include quiescing the link and an initialization begin state/signal can be cleared for the agent to be removed. A remote agent (i.e. the one that is not being removed (e.g., the host agent)) can be set to slow speed and its initialization signal can also be cleared. An in-band reset (e.g., through BLS) can cause both agents to wait in a reset state, such as a Calibrate Reset State (CRS); and the agent to be removed can be removed (or can be held in targeted pin reset, powered down), among other examples and features. Indeed, some of the above events may be omitted and additional events can be added.

Hot add can include initialization speed can default to slow and an initialization signal can be set on the agent to be added. Software can set speed to slow and may clear the initialization signal on the remote agent. The link can come up in slow mode and software can determine an operational speed. In some cases, no PLL relock of a remote is performed at this point. Operational speed can be set on both agents and an enable can be set for adaptation (if not done previously). The initialization begin indicator can be cleared on both agents and an in-band BLS reset can cause both agents to wait in CRS. Software can assert a warm reset (e.g., a targeted or self-reset) of an agent (to be added), which may cause a PLL to relock. Software may also set the initialization begin signal by any known logic and further set on remote (thus advancing it to Receiver Detect State (RDS)). Software can de-assert warm reset of the adding agent (thus advancing it to RDS). The link can then initialize at operational speed to a Transmitting Link State (TLS) (or to Loopback if the adaption signal is set), among other examples. Indeed, some of the above events may be omitted and additional events can be added.

Data lane failure recovery can be supported. A link in HPI, in one embodiment, can be resilient against hard error on a single lane by configuring itself to less than full width (e.g. less than half the full width) which can thereby exclude the faulty lane. As an example, the configuration can be done by link state machine and unused lanes can be turned off in the configuration state. As a result, the flit may be sent across at a narrower width, among other examples.

In some implementations of HPI, lane reversal can be supported on some links. Lane reversal can refer, for instance, to lanes 0/1/2 . . . of a transmitter connected to lanes n/n-1/n-2 . . . of a receiver (e.g. n may equal 19 or 7, etc.). Lane reversal can be detected at the receiver as identified in a field of a TS header. The receiver can handle the lane reversal by starting in a Polling state by using physical lane n . . . 0 for logical lane 0 . . . n. Hence, references to a lane may refer to a logical lane number. Therefore, board designers may more efficiently lay down the physical or electrical design and HPI may work with virtual lane assignments, as described herein. Moreover, in one embodiment, polarity may be inverted (i.e. when a differential transmitter +/− is connected to receiver −/+. Polarity can also be detected at a receiver from one or more TS header fields and handled, in one embodiment, in the Polling State.

Figure 12:
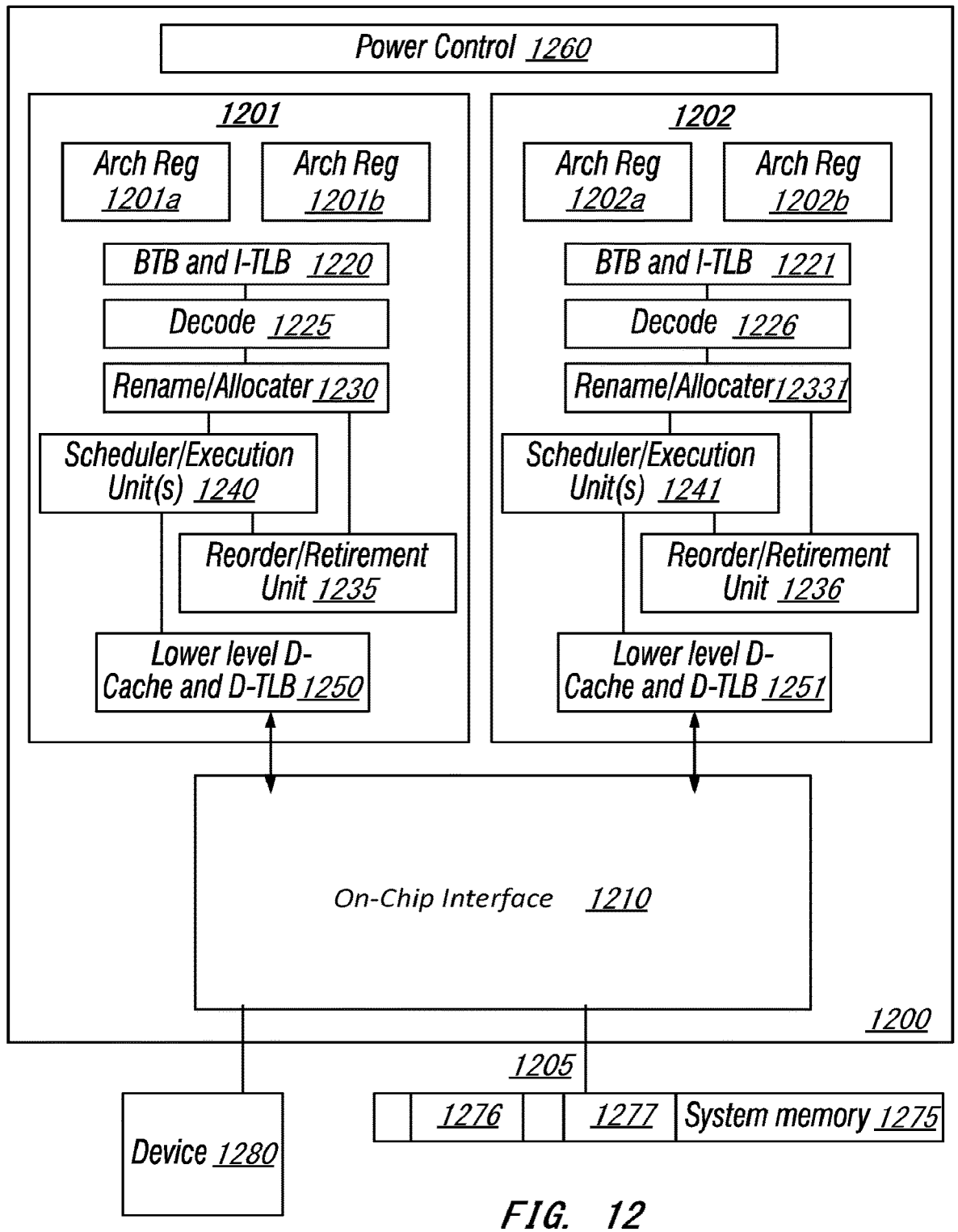
FIG. 12 illustrates an embodiment of a block diagram for a computing system including a multicore processor.

Referring to FIG. 12, an embodiment of a block diagram for a computing system including a multicore processor is depicted. Processor 1200 includes any processor or processing device, such as a microprocessor, an embedded processor, a digital signal processor (DSP), a network processor, a handheld processor, an application processor, a co-processor, a system on a chip (SOC), or other device to execute code. Processor 1200, in one embodiment, includes at least two cores—core 1201 and 1202, which may include asymmetric cores or symmetric cores (the illustrated embodiment). However, processor 1200 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1200, as illustrated in FIG. 12, includes two cores—core 1201 and 1202. Here, core 1201 and 1202 are considered symmetric cores, i.e. cores with the same configurations, functional units, and/or logic. In another embodiment, core 1201 includes an out-of-order processor core, while core 1202 includes an in-order processor core. However, cores 1201 and 1202 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1201 are described in further detail below, as the units in core 1202 operate in a similar manner in the depicted embodiment.

As depicted, core 1201 includes two hardware threads 1201a and 1201b, which may also be referred to as hardware thread slots 1201a and 1201b. Therefore, software entities, such as an operating system, in one embodiment potentially view processor 1200 as four separate processors, i.e., four logical processors or processing elements capable of executing four software threads concurrently. As alluded to above, a first thread is associated with architecture state registers 1201a, a second thread is associated with architecture state registers 1201b, a third thread may be associated with architecture state registers 1202a, and a fourth thread may be associated with architecture state registers 1202b. Here, each of the architecture state registers (1201a, 1201b, 1202a, and 1202b) may be referred to as processing elements, thread slots, or thread units, as described above. As illustrated, architecture state registers 1201a are replicated in architecture state registers 1201b, so individual architecture states/contexts are capable of being stored for logical processor 1201a and logical processor 1201b. In core 1201, other smaller resources, such as instruction pointers and renaming logic in allocator and renamer block 1230 may also be replicated for threads 1201a and 1201b. Some resources, such as reorder buffers in reorder/retirement unit 1235, ILTB 1220, load/store buffers, and queues may be shared through partitioning. Other resources, such as general purpose internal registers, page-table base register(s), low-level data-cache and data-TLB 1215, execution unit(s) 1240, and portions of out-of-order unit 1235 are potentially fully shared.

Processor 1200 often includes other resources, which may be fully shared, shared through partitioning, or dedicated by/to processing elements. In FIG. 12, an embodiment of a purely exemplary processor with illustrative logical units/resources of a processor is illustrated. Note that a processor may include, or omit, any of these functional units, as well as include any other known functional units, logic, or firmware not depicted. As illustrated, core 1201 includes a simplified, representative out-of-order (OOO) processor core. But an in-order processor may be utilized in different embodiments. The OOO core includes a branch target buffer 1220 to predict branches to be executed/taken and an instruction-translation buffer (I-TLB) 1220 to store address translation entries for instructions.

Core 1201 further includes decode module 1225 coupled to fetch unit 1220 to decode fetched elements. Fetch logic, in one embodiment, includes individual sequencers associated with thread slots 1201a, 1201b, respectively. Usually core 1201 is associated with a first ISA, which defines/specifies instructions executable on processor 1200. Often machine code instructions that are part of the first ISA include a portion of the instruction (referred to as an opcode), which references/specifies an instruction or operation to be performed. Decode logic 1225 includes circuitry that recognizes these instructions from their opcodes and passes the decoded instructions on in the pipeline for processing as defined by the first ISA. For example, as discussed in more detail below decoders 1225, in one embodiment, include logic designed or adapted to recognize specific instructions, such as transactional instruction. As a result of the recognition by decoders 1225, the architecture or core 1201 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1226, in one embodiment, recognize the same ISA (or a subset thereof). Alternatively, in a heterogeneous core environment, decoders 1226 recognize a second ISA (either a subset of the first ISA or a distinct ISA).

In one example, allocator and renamer block 1230 includes an allocator to reserve resources, such as register files to store instruction processing results. However, threads 1201a and 1201b are potentially capable of out-of-order execution, where allocator and renamer block 1230 also reserves other resources, such as reorder buffers to track instruction results. Unit 1230 may also include a register renamer to rename program/instruction reference registers to other registers internal to processor 1200. Reorder/retirement unit 1235 includes components, such as the reorder buffers mentioned above, load buffers, and store buffers, to support out-of-order execution and later in-order retirement of instructions executed out-of-order.

Scheduler and execution unit(s) block 1240, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1250 are coupled to execution unit(s) 1240. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1201 and 1202 share access to higher-level or further-out cache, such as a second level cache associated with on-chip interface 1210. Note that higher-level or further-out refers to cache levels increasing or getting further way from the execution unit(s). In one embodiment, higher-level cache is a last-level data cache—last cache in the memory hierarchy on processor 1200—such as a second or third level data cache. However, higher level cache is not so limited, as it may be associated with or include an instruction cache. A trace cache—a type of instruction cache—instead may be coupled after decoder 1225 to store recently decoded traces. Here, an instruction potentially refers to a macro-instruction (i.e. a general instruction recognized by the decoders), which may decode into a number of micro-instructions (micro-operations).

In the depicted configuration, processor 1200 also includes on-chip interface module 1210. Historically, a memory controller, which is described in more detail below, has been included in a computing system external to processor 1200. In this scenario, on-chip interface 121 is to communicate with devices external to processor 1200, such as system memory 1275, a chipset (often including a memory controller hub to connect to memory 1275 and an I/O controller hub to connect peripheral devices), a memory controller hub, a northbridge, or other integrated circuit. And in this scenario, bus 1205 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1275 may be dedicated to processor 1200 or shared with other devices in a system. Common examples of types of memory 1275 include DRAM, SRAM, non-volatile memory (NV memory), and other known storage devices. Note that device 1280 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1200. For example in one embodiment, a memory controller hub is on the same package and/or die with processor 1200. Here, a portion of the core (an on-core portion) 1210 includes one or more controller(s) for interfacing with other devices such as memory 1275 or a graphics device 1280. The configuration including an interconnect and controllers for interfacing with such devices is often referred to as an on-core (or un-core configuration). As an example, on-chip interface 1210 includes a ring interconnect for on-chip communication and a high-speed serial point-to-point link 1205 for off-chip communication. Yet, in the SOC environment, even more devices, such as the network interface, co-processors, memory 1275, graphics processor 1280, and any other known computer devices/interface may be integrated on a single die or integrated circuit to provide small form factor with high functionality and low power consumption.

In one embodiment, processor 1200 is capable of executing a compiler, optimization, and/or translator code 1277 to compile, translate, and/or optimize application code 1276 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 13:
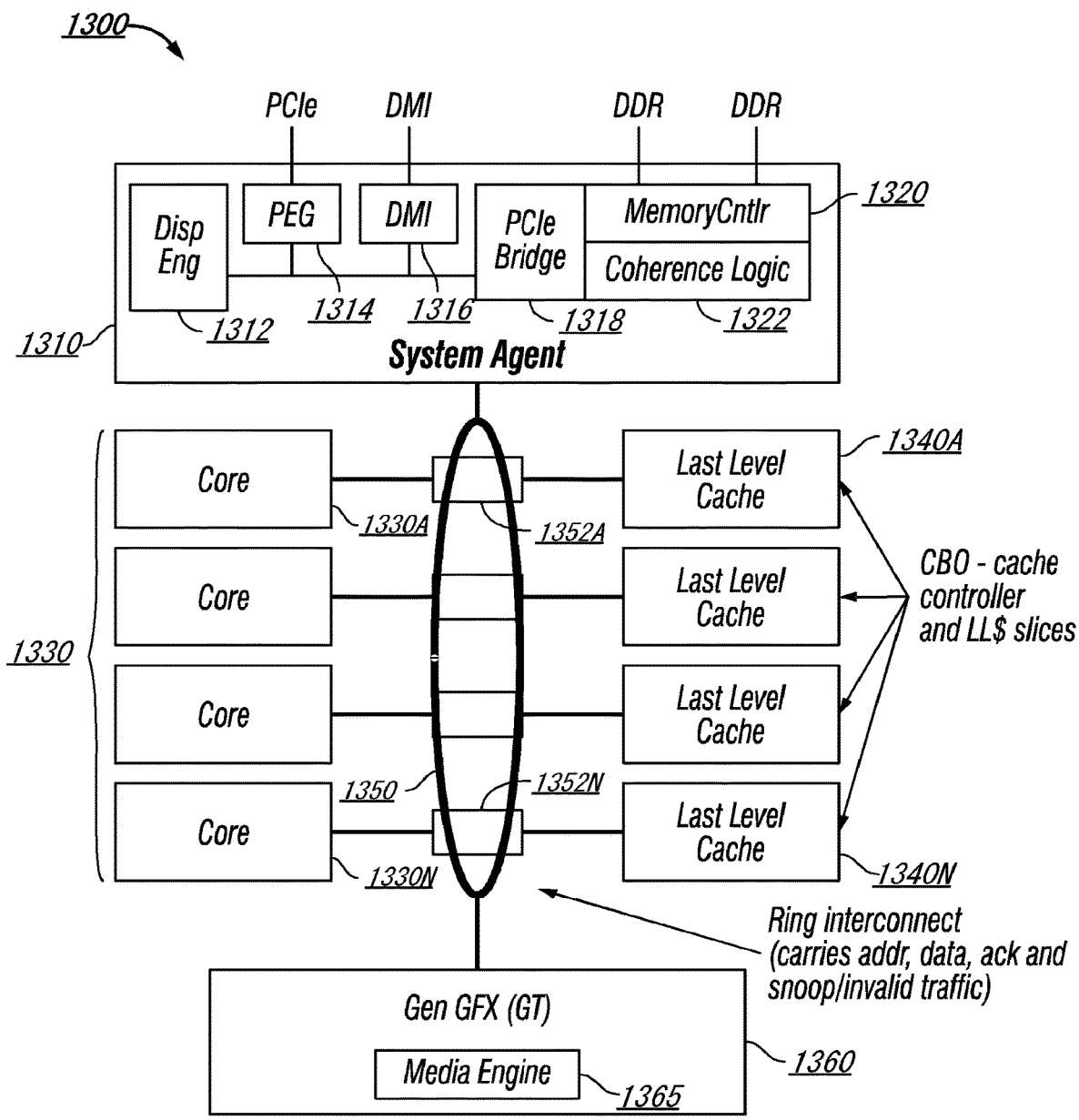
FIG. 13 illustrates another embodiment of a block diagram for a computing system including a multicore processor.

Referring now to FIG. 13, shown is a block diagram of an embodiment of a multicore processor. As shown in the embodiment of FIG. 13, processor 1300 includes multiple domains. Specifically, a core domain 1330 includes a plurality of cores 1330A-1330N, a graphics domain 1360 includes one or more graphics engines having a media engine 1365, and a system agent domain 1310.

In various embodiments, system agent domain 1310 handles power control events and power management, such that individual units of domains 1330 and 1360 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1330 and 1360 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1330 further includes low level caches in addition to various execution units and additional processing elements. Here, the various cores are coupled to each other and to a shared cache memory that is formed of a plurality of units or slices of a last level cache (LLC) 1340A-1340N; these LLCs often include storage and cache controller functionality and are shared amongst the cores, as well as potentially among the graphics engine too.

As seen, a ring interconnect 1350 couples the cores together, and provides interconnection between the core domain 1330, graphics domain 1360 and system agent circuitry 1310, via a plurality of ring stops 1352A-1352N, each at a coupling between a core and LLC slice. As seen in FIG. 13, interconnect 1350 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g.

another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1310 includes display engine 1312 which is to provide control of and an interface to an associated display. System agent domain 1310 may include other units, such as: an integrated memory controller 1320 that provides for an interface to a system memory (e.g., a DRAM implemented with multiple DIMMs; coherence logic 1322 to perform memory coherence operations. Multiple interfaces may be present to enable interconnection between the processor and other circuitry. For example, in one embodiment at least one direct media interface (DMI) 1316 interface is provided as well as one or more PCIe™ interfaces 1314. The display engine and these interfaces typically couple to memory via a PCIe™ bridge 1318. Still further, to provide for communications between other agents, such as additional processors or other circuitry, one or more other interfaces may be provided.

Referring now to FIG. 14, shown is a block diagram of a representative core; specifically, logical blocks of a back-end of a core, such as core 1330 from FIG. 13. In general, the structure shown in FIG. 14 includes an out-of-order processor that has a front end unit 1470 used to fetch incoming instructions, perform various processing (e.g. caching, decoding, branch predicting, etc.) and passing instructions/operations along to an out-of-order (OOO) engine 1480. OOO engine 1480 performs further processing on decoded instructions.

Specifically in the embodiment of FIG. 14, out-of-order engine 1480 includes an allocate unit 1482 to receive decoded instructions, which may be in the form of one or more micro-instructions or uops, from front end unit 1470, and allocate them to appropriate resources such as registers and so forth. Next, the instructions are provided to a reservation station 1484, which reserves resources and schedules them for execution on one of a plurality of execution units 1486A-1486N. Various types of execution units may be present, including, for example, arithmetic logic units (ALUs), load and store units, vector processing units (VPUs), floating point execution units, among others. Results from these different execution units are provided to a reorder buffer (ROB) 1488, which take unordered results and return them to correct program order.

Still referring to FIG. 14, note that both front end unit 1470 and out-of-order engine 1480 are coupled to different levels of a memory hierarchy. Specifically shown is an instruction level cache 1472, that in turn couples to a mid-level cache 1476, that in turn couples to a last level cache 1495. In one embodiment, last level cache 1495 is implemented in an on-chip (sometimes referred to as uncore) unit 1490. As an example, unit 1490 is similar to system agent 1310 of FIG. 13. As discussed above, uncore 1490 communicates with system memory 1499, which, in the illustrated embodiment, is implemented via ED RAM. Note also that the various execution units 1486 within out-of-order engine 1480 are in communication with a first level cache 1474 that also is in communication with mid-level cache 1476. Note also that additional cores 1430N-2-1430N can couple to LLC 1495. Although shown at this high level in the embodiment of FIG. 14, understand that various alterations and additional components may be present.

Figure 15:
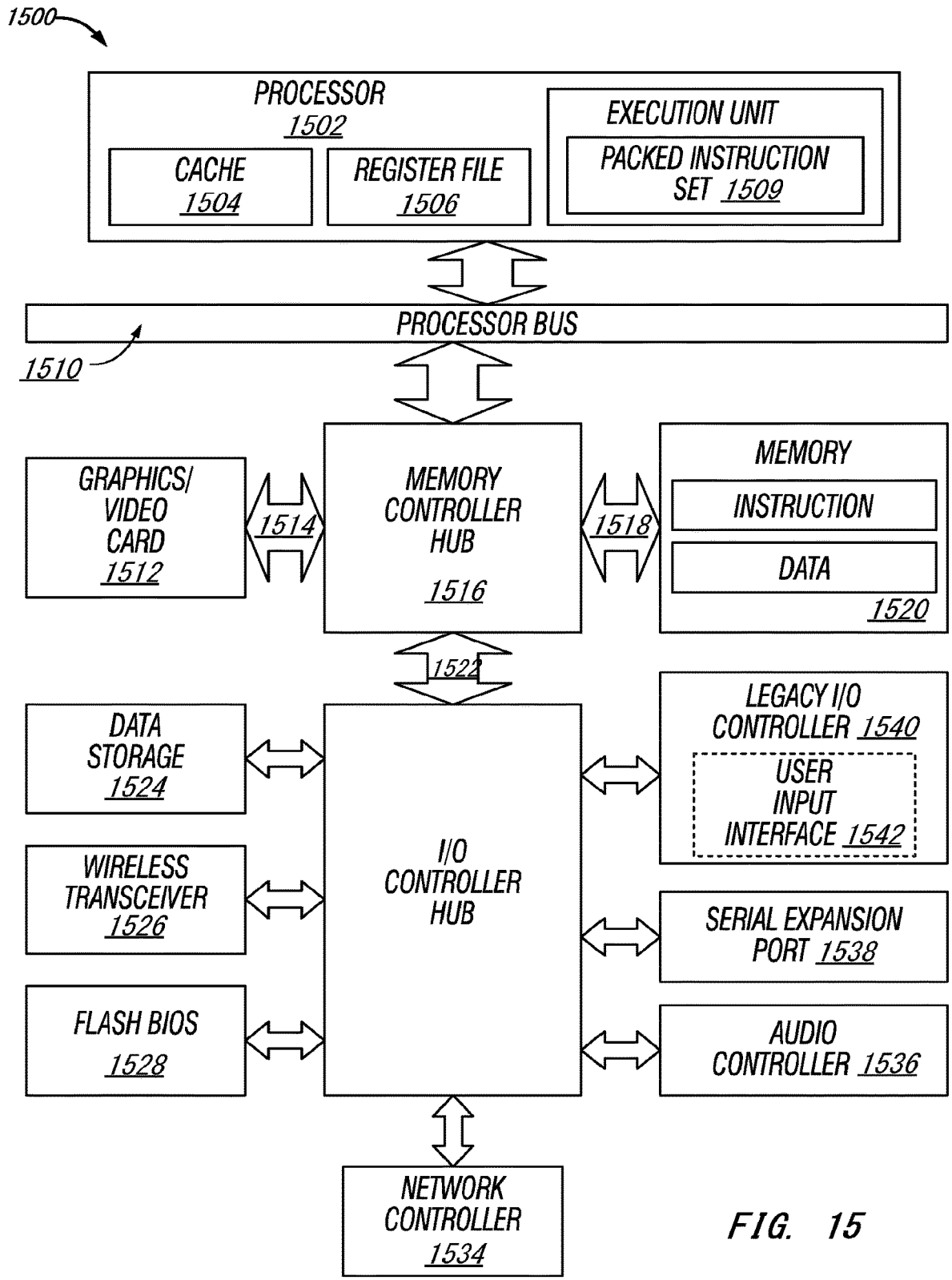
FIG. 15 illustrates another embodiment of a block diagram for a computing system including a processor.

Turning to FIG. 15, a block diagram of an exemplary computer system formed with a processor that includes execution units to execute an instruction, where one or more of the interconnects implement one or more features in accordance with one embodiment of the present invention is illustrated. System 1500 includes a component, such as a processor 1502 to employ execution units including logic to perform algorithms for process data, in accordance with the present invention, such as in the embodiment described herein. System 1500 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1500 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1502 includes one or more execution units 1508 to implement an algorithm that is to perform at least one instruction. One embodiment may be described in the context of a single processor desktop or server system, but alternative embodiments may be included in a multiprocessor system. System 1500 is an example of a 'hub' system architecture. The computer system 1500 includes a processor 1502 to process data signals. The processor 1502, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1502 is coupled to a processor bus 1510 that transmits data signals between the processor 1502 and other components in the system 1500. The elements of system 1500 (e.g. graphics accelerator 1512, memory controller hub 1516, memory 1520, I/O controller hub 1524, wireless transceiver 1526, Flash BIOS 1528, Network controller 1534, Audio controller 1536, Serial expansion port 1538, I/O controller 1540, etc.) perform their conventional functions that are well known to those familiar with the art.

In one embodiment, the processor 1502 includes a Level 1 (L1) internal cache memory 1504. Depending on the architecture, the processor 1502 may have a single internal cache or multiple levels of internal caches. Other embodiments include a combination of both internal and external caches depending on the particular implementation and needs. Register file 1506 is to store different types of data in various registers including integer registers, floating point registers, vector registers, banked registers, shadow registers, checkpoint registers, status registers, and instruction pointer register.

Execution unit 1508, including logic to perform integer and floating point operations, also resides in the processor 1502. The processor 1502, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1502. For one embodiment, execution unit 1508 includes logic to handle a packed instruction set 1509. By including the packed instruction set 1509 in the instruction set of a general-purpose processor 1502, along with associated circuitry to execute the instructions, the operations used by many multimedia applications may be performed using packed data in a general-purpose processor 1502. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1508 may also be used in micro controllers, embedded processors, graphics devices, DSPs, and other types of logic circuits. System 1500 includes a memory 1520. Memory 1520 includes a dynamic random access memory (DRAM) device, a static random access memory (SRAM) device, flash memory device, or other memory device. Memory 1520 stores instructions and/or data represented by data signals that are to be executed by the processor 1502.

Note that any of the aforementioned features or aspects of the invention may be utilized on one or more interconnect illustrated in FIG. 15. For example, an on-die interconnect (ODI), which is not shown, for coupling internal units of processor 1502 implements one or more aspects of the invention described above. Or the invention is associated with a processor bus 1510 (e.g. other known high performance computing interconnect), a high bandwidth memory path 1518 to memory 1520, a point-to-point link to graphics accelerator 1512 (e.g. a Peripheral Component Interconnect express (PCIe) compliant fabric), a controller hub interconnect 1522, an I/O or other interconnect (e.g. USB, PCI, PCIe) for coupling the other illustrated components. Some examples of such components include the audio controller 1536, firmware hub (flash BIOS) 1528, wireless transceiver 1526, data storage 1524, legacy I/O controller 1510 containing user input and keyboard interfaces 1542, a serial expansion port 1538 such as Universal Serial Bus (USB), and a network controller 1534. The data storage device 1524 can comprise a hard disk drive, a floppy disk drive, a CD-ROM device, a flash memory device, or other mass storage device.

Figure 16:
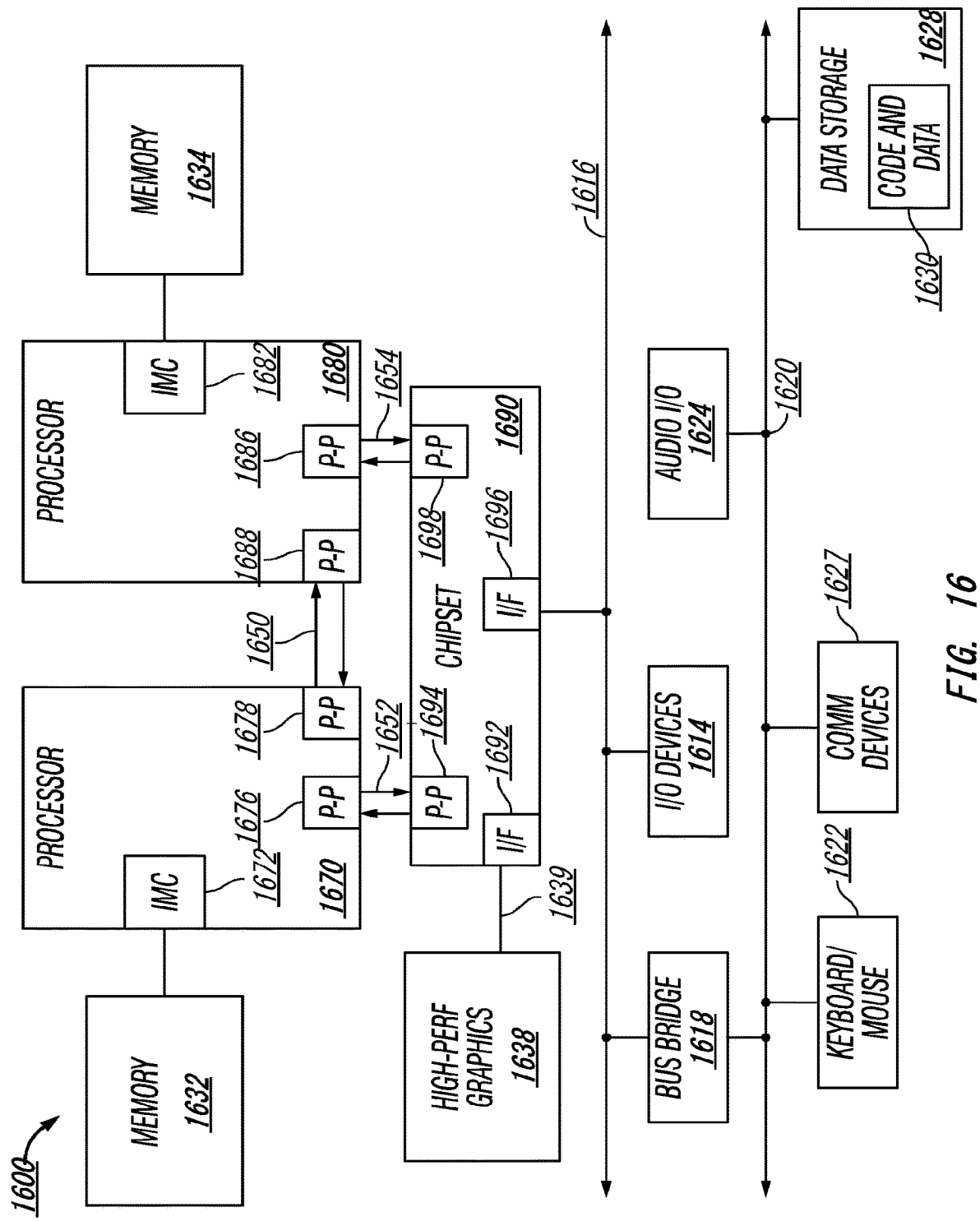
FIG. 16 illustrates an embodiment of a block for a computing system including multiple processor sockets.

Referring now to FIG. 16, shown is a block diagram of a second system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of a processor. In one embodiment, 1652 and 1654 are part of a serial, point-to-point coherent interconnect fabric, such as a high-performance architecture. As a result, the invention may be implemented within the QPI architecture.

While shown with only two processors 1670, 1680, it is to be understood that the scope of the present invention is not so limited. In other embodiments, one or more additional processors may be present in a given processor.

Processors 1670 and 1680 are shown including integrated memory controller units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 each exchange information with a chipset 1690 via individual P-P interfaces 1652, 1654 using point to point interface circuits 1676, 1694, 1686, 1698. Chipset 1690 also exchanges information with a high-performance graphics circuit 1638 via an interface circuit 1692 along a high-performance graphics interconnect 1639.

A shared cache (not shown) may be included in either processor or outside of both processors; yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 are coupled to first bus 1616, along with a bus bridge 1618 which couples first bus 1616 to a second bus 1620. In one embodiment, second bus 1620 includes a low pin count (LPC) bus. Various devices are coupled to second bus 1620 including, for example, a keyboard and/or mouse 1622, communication devices 1627 and a storage unit 1628 such as a disk drive or other mass storage device which often includes instructions/code and data 1630, in one embodiment. Further, an audio I/O 1624 is shown coupled to second bus 1620. Note that other architectures are possible, where the included components and interconnect architectures vary. For example, instead of the point-to-point architecture of FIG. 16, a system may implement a multi-drop bus or other such architecture.

Figure 17:
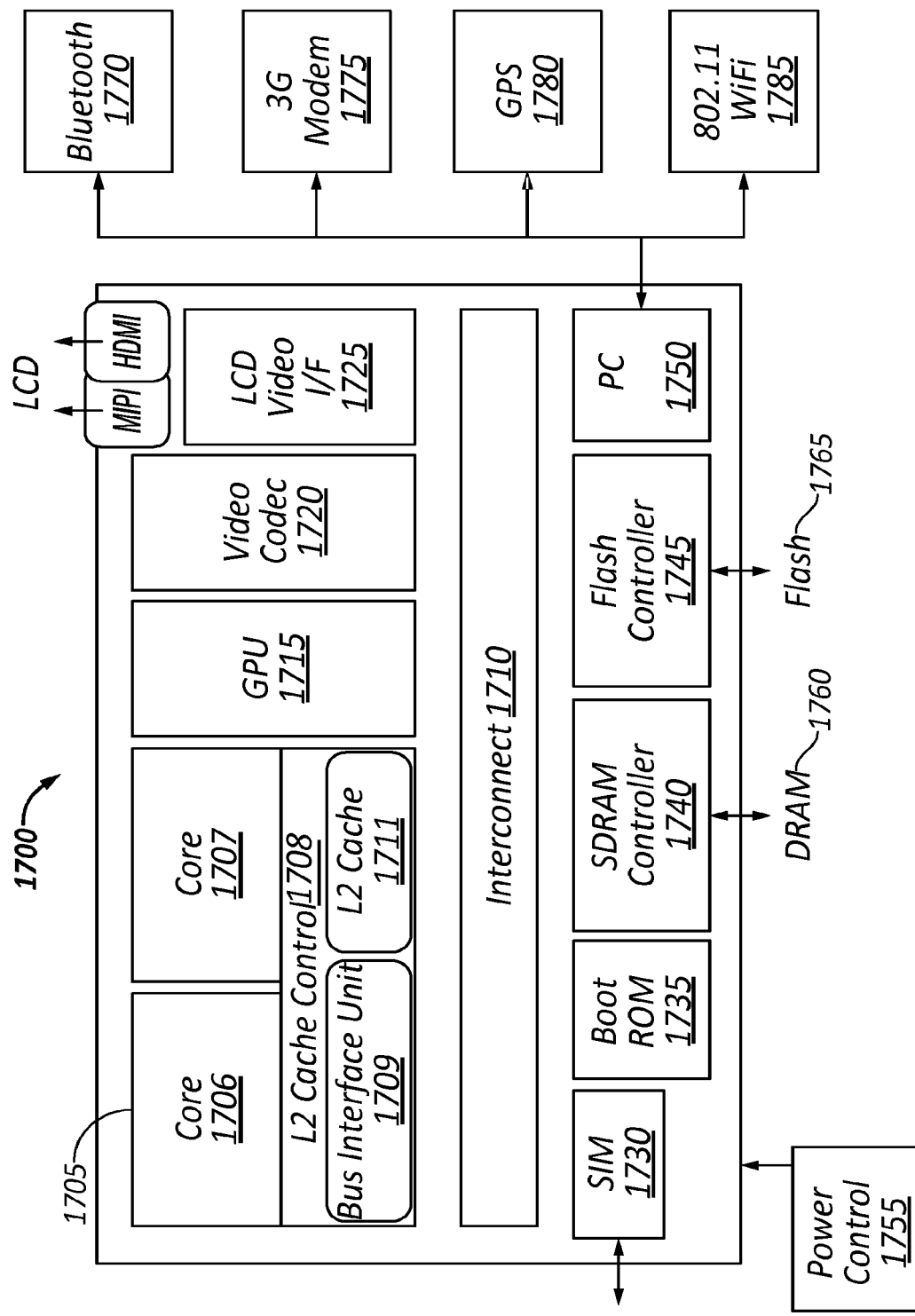
FIG. 17 illustrates another embodiment of a block diagram for a computing system.

Turning next to FIG. 17, an embodiment of a system on-chip (SOC) design in accordance with the inventions is depicted. As a specific illustrative example, SOC 1700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1700 includes 2 cores—1706 and 1707. Similar to the discussion above, cores 1706 and 1707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1706 and 1707 are coupled to cache control 1708 that is associated with bus interface unit 1709 and L2 cache 1711 to communicate with other parts of system 1700. Interconnect 1710 includes an on-chip interconnect, such as an IOSF, AMBA, or other interconnect discussed above, which potentially implements one or more aspects of described herein.

Interface 1710 provides communication channels to the other components, such as a Subscriber Identity Module (SIM) 1730 to interface with a SIM card, a boot rom 1735 to hold boot code for execution by cores 1706 and 1707 to initialize and boot SOC 1700, a SDRAM controller 1740 to interface with external memory (e.g. DRAM 1760), a flash controller 1745 to interface with non-volatile memory (e.g. Flash 1765), a peripheral control 1750 (e.g. Serial Peripheral Interface) to interface with peripherals, video codecs 1720 and Video interface 1725 to display and receive input (e.g. touch enabled input), GPU 1715 to perform graphics related computations, etc. Any of these interfaces may incorporate aspects of the invention described herein.

In addition, the system illustrates peripherals for communication, such as a Bluetooth module 1770, 3G modem 1775, GPS 1785, and WiFi 1785. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element.

A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to provide a synchronization counter and a layered stack including physical layer logic, link layer logic, and protocol layer logic, where the physical layer logic is to synchronize a reset of the synchronization counter to an external deterministic signal and synchronize entry into a link transmitting state with the deterministic signal.

In at least one example, the physical layer logic is further to initialize a data link using one or more supersequences.

In at least one example, entry into the link transmitting state is to coincide with a start of data sequence (SDS) sent to end initialization of the data link.

In at least one example, the SDS is to be sent according to the deterministic signal.

In at least one example, each supersequence includes a respective repeating sequence including an electric idle exit ordered set and a respective number of training sequences.

In at least one example, the SDS is to interrupt the supersequences.

In at least one example, the supersequences each include a respective repeating sequence including at least one electric idle exit ordered set (EIEOS) and a respective number of training sequences.

In at least one example, the EIEOS of a supersequence is to be sent so as to coincide with synchronization counter.

In at least one example, the physical layer logic is further to synchronize to a deterministic interval based on a received EIEOS.

In at least one example, synchronizing to a deterministic interval based on a received EIEOS includes identifying an end boundary of the received EIEOS.

In at least one example, the end boundary is to be used to synchronize entry into the link transmitting state.

In at least one example, the end boundary is to be used to synchronize exit from a partial width link transmitting state.

In at least one example, the physical layer logic is further to generate a particular supersequence and send the particular supersequence to be synchronized with the deterministic signal.

In at least one example, the physical layer logic is to specify a target latency to a remote agent, where the remote agent is to use the target latency to apply a delay to adjust actual latency to the target latency.

In at least one example, the target latency is to be communicated in a payload of a training sequence.

In at least one example, the deterministic signal includes a planetary alignment signal for a device.

In at least one example, the physical layer logic is further to synchronize a periodic control window embedded in a link layer data stream sent over a serial data link with the deterministic signal, where the control window is configured for the exchange of physical layer information during a link transmitting state.

In at least one example, the physical layer information includes information for use in initiating state transitions on the data link.

In at least one example, control windows are embedded according to a defined control interval and the control interval is based at least in part on the deterministic signal.

One or more examples can further provide sending the supersequences to a remote agent connected to the data link during initialization of the data link and at least one element of the supersequence is to be synchronized with the deterministic signal.

In at least one example, the element includes an EIEOS.

In at least one example, each supersequence includes a respective repeating sequence including at least EIEOS and a respective number of training sequences.

One or more examples can further provide sending a stream of link layer flits in the link transmitting state.

One or more examples can further provide synchronizing a periodic control window to be embedded in the stream with the deterministic signal, where the control window is configured for the exchange of physical layer information during the link transmitting state.

One or more examples can further provide sending delay information to a remote agent connected to the data link, where the delay corresponds to the deterministic signal.

One or more embodiments may provide an apparatus, a system, a machine readable storage, a machine readable medium, and a method to identify a target latency for a serial data link, receive, over the data link, a data sequence synchronized with a synchronization counter associated with the data link, and maintain the target latency using the data sequence.

In at least one example, the data sequence includes a supersequence to include a repeating sequence, where the sequence is to repeat at a defined frequency.

In at least one example, the sequence is to include an electric idle exit ordered set (EIEOS).

In at least one example, the sequence is to begin with the EIEOS followed by a predefined number of training sequences.

In at least one example, at least one of the training sequences includes data identifying the target latency.

In at least one example, at least a portion of the sequence is to be scrambled using a pseudorandom binary sequence (PRBS).

One or more examples can further provide determining an actual latency of the data link based on the receipt of the data sequence.

One or more examples can further provide determining a deviation by the actual latency from the target latency.

One or more examples can further provide causing the deviation to be corrected.

One or more embodiments may provide an apparatus, a system, a machine readable storage, a machine readable medium, and a method to determine whether width of flits to be sent over a serial data link including a number of lanes are a multiple of the number of lanes, and transmit the flits over the serial data link, where two flits are to be sent so as to overlap on the lanes when the width of the flits is not a multiple of the number of lanes.

In at least one example, overlapping includes sending one or more bits of a first of the two flits over a first portion of the number of lanes concurrently with the sending of one or more bits of a second of the two flits over a second portion of the number of lanes.

In at least one example, at least some bits of the flits are to be transmitted out of order.

In at least one example, flits do not overlap when the width of the flits is a multiple of the number of lanes.

In at least one example, the width of the flits include 192 bits.

In at least one example, the number of lanes includes 20 lanes in at least one link transmitting state.

One or more examples can further provide transitioning to a different new link width including a second number of lanes.

One or more examples can further provide determining whether the width of the flits are a multiple of the second number of lanes In at least one example, the transition is to be aligned with a non-overlapping flit boundary.

One or more embodiments may provide an apparatus, a system, a machine readable storage, a machine readable medium, and a method to provide physical layer logic to receive a bit stream including a set of flits over a serial data link, where respective portions of at least two of the set of flits are sent concurrently on lanes of the data link, and link layer logic to reconstruct the set of flits from the received bit stream.

In at least one example, a portion of the set of flits have overlapping boundaries.

In at least one example, overlapping boundaries includes sending one or more final bits of a first of the two flits over a first portion of the number of lanes concurrently with the sending of one or more beginning bits of a second of the two flits over a second portion of the number of lanes.

In at least one example, the width of the flits is not a multiple of the number of lanes of the data link.

In at least one example, the width of the flits include 192 bits and the number of lanes includes 20 lanes.

In at least one example, at least a portion of bits of the flits are transmitted out of order.

One or more examples can further provide a physical layer (PHY) configured to be coupled to a link, the link including a first number of lanes, where the PHY is to enter a loopback state, and where the PHY, when resident in the loopback state, is to inject specialized patterns on the link.

One or more examples can further provide a physical layer (PHY) configured to be coupled to a link, the link including a first number of lanes, where the PHY includes a synchronization (sync) counter, and where the PHY is to transmit an Electrically Idle Exit Order Set (EIEOS) aligned with the sync counter associated with a training sequence.

In at least one example, a sync counter value from the sync counter is not exchanged during each training sequence.

In at least one example, the EIEOS alignment with the sync counter is to act as a proxy for exchanging the sync counter value from the sync counter during each training sequence.

One or more examples can further provide a physical layer (PHY) configured to be coupled to a link, the PHY to include a PHY state machine to transition between a plurality of states, where the PHY state machine is capable of transitioning from a first state to a second state based on a handshake event and transitioning the PHY from a third state to a fourth state based on a primary timer event.

In at least one example, the PHY state machine is capable of transitioning the PHY from a fifth state to a sixth state based on a primary time event in combination with a secondary timer event.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. An apparatus comprising:
a port to couple to a device over an interconnect, wherein the port comprises protocol circuitry to establish a link on the interconnect, wherein the interconnect comprises a set of physical lanes, and the protocol circuitry is to:
enter a partial width transmitting link state, wherein a first number of lanes in the set of lanes are to be used to communicate data on the link in the partial width transmitting link state;
send a first packet on the link in the partial width transmitting link state, wherein the first packet is encoded by the physical layer circuitry as a first set of flits;
send an electrical ordered set on the link to cause the link to transition from the partial width transmitting link state to a transmitting link state, wherein a second number of lanes in the set of lanes are to be used to communicate data in the transmitting link state, and the second number is greater than the first number; and send a second packet on the link during the transmitting link state, wherein the second packet is encoded by the physical layer circuitry as a second set of flits.

2. The apparatus of claim 1, wherein the flits are sent to interleave the flits on the physical lanes.

3. The apparatus of claim 1, wherein the protocol circuitry is to determine a cyclic redundancy check (CRC) value for a particular one of the first set of flits and the particular flit comprises the CRC value.

4. The apparatus of claim 1, wherein at least portions of two or more of the packets are transmitted on the link through a particular one of the first set of flits.

5. The apparatus of claim 1, wherein the link is established based on an interconnect protocol and the packets and the flits are based on the interconnect protocol.

6. The apparatus of claim 5, wherein the interconnect protocol comprises a Peripheral Component Interconnect Express (PCIe)-based protocol.

7. The apparatus of claim 5, wherein the interconnect protocol is a layered interconnect protocol and comprises a transaction layer, a data link layer, and a physical layer.

8. The apparatus of claim 5, wherein each flit in the first set of flits and the second flits has a defined length based on the interconnect protocol.

9. The apparatus of claim 1, wherein unused lanes in the set of lanes are in a sleep state in the partial width transmitting link state.

10. The apparatus of claim 1, wherein the electrical ordered set comprises an electric idle exit ordered set (EIEOS).

11. The apparatus of claim 1, wherein the electrical ordered set is sent in a sequence comprising an instance of the electrical ordered set followed by a defined number of consecutive training sequences.

12. The apparatus of claim 1, wherein the partial width transmitting link state is entered without hampering normal traffic on the link.

13. A method comprising:
establishing a link on an interconnect based on an interconnect protocol, wherein the interconnect comprises a set of physical lanes, and the interconnect connects a first device to a second device;
causing the link to enter a partial width transmitting link state, wherein a first subset of the set of lanes are to be active and a second subset of the set of lanes are to be asleep in the partial width transmitting link state;
sending a first flit on the first subset of lanes in the partial width transmitting link state, wherein the first flit includes at least a portion of a first packet, and the first flit is of a defined length;
sending an electrical ordered set on an interconnect to cause the link to transition from the partial width transmitting link state to a transmitting link state, wherein the set of lanes are to be used to communicate data in the transmitting link state; and
sending a second flit on the set of lanes in the transmitting link state, wherein the second flit includes at least a portion of a second packet, and the second flit is of the defined length.

14. The method of claim 13, wherein the interconnect protocol comprises a PCIe-based protocol.

15. The method of claim 14, wherein the transmitting link state comprises an L0 state and the partial width transmitting link state comprises an L0p state.

16. The method of claim 13, wherein the electrical ordered set comprises an electric idle exit ordered set (EIEOS).

17. The method of claim 13, further comprising sending the flit, wherein sending flits comprises interleaving the flits on the physical lanes.

18. A system comprising:
a host device comprising a processor core; and
an endpoint device coupled to the host device by a link, wherein the link comprises a plurality of physical lanes, and the endpoint device comprises protocol circuitry to establish the link according to an interconnect protocol, and the protocol circuitry is to:
enter a partial width transmitting link state on the link, wherein a first subset of the plurality of lanes are active and a second subset of the plurality of lanes are inactive in the partial width transmitting link state;
send a first flit on the first subset of the plurality of lanes while in the partial width transmitting link state, wherein the first flit is sent to communicate at least a portion of a first packet to the host device;
send an electrical ordered set followed by a defined number of consecutive training sequences in association with a transition from the partial width transmitting link state to a transmitting link state, wherein the plurality of lanes are active in the transmitting link state; and
send a second flit to the host device on the plurality of lanes during the transmitting link state, wherein the second flit is sent to communicate at least a portion of a second packet to the host device.

19. The system of claim 18, wherein the host device comprises receiver protocol circuitry to:
receive the first flit from the endpoint device over the link;
identify the first packet from data in the first flit;
receive the second flit from the endpoint device over the link; and
identify the second packet from data in the second flit.

20. The system of claim 18, wherein the link is compliant with a PCIe-based protocol.

21. The system of claim 18, wherein the electrical ordered set comprises an electric idle exit ordered set (EIEOS).

22. The system of claim 18, wherein the first subset of lanes remain in an active state during the transition from the partial width transmitting link state to a transmitting link state.

23. The system of claim 18, wherein the endpoint device comprises an accelerator device.

24. The system of claim 18, wherein the endpoint device comprises a memory device.

25. The system of claim 18, wherein the endpoint device comprises a graphics device.

26. The system of claim 18, wherein the endpoint device comprises a network controller.

* * * * *